(12) United States Patent
Taylor et al.

(10) Patent No.: US 12,210,763 B1
(45) Date of Patent: Jan. 28, 2025

(54) TECHNIQUES FOR USER SNAPSHOT ORCHESTRATION DURING ASYNCHRONOUS REPLICATION

(71) Applicant: Dell Products L.P., Hopkinton, MA (US)

(72) Inventors: Alan L. Taylor, Cary, NC (US); Nagapraveen Veeravenkata Seela, Cary, NC (US); Girish Sheelvant, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/486,579

(22) Filed: Oct. 13, 2023

(51) Int. Cl.
*G06F 3/06* (2006.01)

(52) U.S. Cl.
CPC ............ *G06F 3/065* (2013.01); *G06F 3/0619* (2013.01); *G06F 3/067* (2013.01)

(58) Field of Classification Search
CPC ......... G06F 3/065; G06F 3/067; G06F 3/0619
See application file for complete search history.

(56) References Cited

U.S. PATENT DOCUMENTS

| | | | |
|---|---|---|---|
| 10,761,941 B1 * | 9/2020 | Redko ................. | G06F 11/1451 |
| 2020/0348980 A1 * | 11/2020 | Meiri ................... | G06F 9/5061 |
| 2021/0034484 A1 * | 2/2021 | Meiri ................... | G06F 13/28 |

OTHER PUBLICATIONS

U.S. Appl. No. 18/486,547, filed Oct. 13, 2023, entitled Techniques for Creating Identical Snapshots of Replicated Volumes, Alan L. Taylor, et al.
U.S. Appl. No. 18/142,224, filed May 2, 2023, entitled Techniques for Adding and Removing Storage Objects From Groups, Dmitry Nikolayevich Tylik, et al.

* cited by examiner

*Primary Examiner* — Jane W Benner
(74) *Attorney, Agent, or Firm* — Muirhead and Saturnelli, LLC

(57) ABSTRACT

Techniques can include: performing asynchronous replication for a source storage object and a target storage object; tracking writes tagged with a tracking identifier associated with a replication related snapshot of the source storage object; receiving a request at a source system to create identical user snapshots of the source storage object and the target storage object; creating a user snapshot of the source storage object; and storing a record in metadata of tracked writes denoting a time order of the request relative to tracked writes tagged with the tracking identifier; determining, in accordance with said tracking, first tracked writes tagged with the tracking identifier that are received before the request; replicating, to the target system, data changes from the replication related snapshot corresponding to the first tracked writes; and creating a user snapshot of the target storage object after data changes are applied to the target storage object.

20 Claims, 11 Drawing Sheets

TECHNIQUES FOR USER SNAPSHOT ORCHESTRATION DURING ASYNCHRONOUS REPLICATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: performing asynchronous replication of a stretched storage object configured from a source storage object of a source system and a target storage object of a target system; tracking writes that are directed to the source storage object and tagged with a first tracking identifier (ID) associated with a first replication related snapshot of the source storage object, wherein said tracking includes recording metadata of tracked writes including target locations written to by tagged writes; receiving a request at the source system to create identical user snapshots of the source storage object and the target storage object; in response to receiving the request at the source system, performing first processing including: creating a first user snapshot of the source storage object on the source system; and storing a record in the metadata of tracked writes denoting a time order of the request relative to tracked writes tagged with the first tracking ID; determining, in accordance with said tracking, a first set of tracked writes that are directed to the source storage object, tagged with the first tracking ID, and received before the request to create identical snapshots; determining, using the metadata of tracked writes, a first set of locations of the source storage object corresponding to the first set of tracked writes; determining first data changes, that correspond to the first set of locations, from the first replication related snapshot of the source object; replicating the first data changes from the source system to the target system; applying the first data changes to the target storage object; and creating a second user snapshot of the target storage object after the first data changes are applied to the target storage object.

In at least one embodiment, the source storage object and the target storage object can be configured to have a same identity as a same storage object when exposed to a host over paths from the source system and target system. Writes to the source storage object received at the source system can be automatically asynchronously replicated from the source system to the target system and applied to the target storage object. The step of tracking can be included in second processing performed to create the first replication related snapshot of the source storage object, and the second processing can further comprise tagging writes directed to the source storage object with the first tracking ID associated with the first replication related snapshot of the source storage object.

In at least one embodiment, processing can include before receiving the request at the source system to create identical user snapshots of the source storage object and the target storage object, sending first writes directed to the stretched volume from the host to the source system, wherein the first writes are applied to the source storage object and automatically asynchronously replicated to the target system, the first writes are tagged with the first tracking ID, the first writes are tracked by said tracking, and the first writes are included in the first set of tracked writes. The metadata of tracked writes can indicate that the first writes are received at the source system at one or more times prior to receiving the request to create identical user snapshots. Processing can include, after receiving the request at the source system to create identical user snapshots of the source storage object and the target storage object, sending second writes directed to the stretched volume from the host to the source system, wherein the second writes can be applied to the source storage object and automatically asynchronously replicated to the target system, the second writes can be tagged with the first tracking ID, the second writes can be tracked by said tracking, and the second writes may not be included in the first set of tracked writes. The metadata of tracked writes can indicate that the second writes are received at the source system at one or more times after receiving the request to create identical snapshots. The first user snapshot of the source storage object on the source system can include the first writes and may not include the second writes. The second user snapshot of the target storage object on the target system can include the first writes and may not include the second writes, and the first user snapshot and the second user snapshot can be identical in terms of content.

In at least one embodiment, processing can include: determining, in accordance with said tracking, a second set of tracked writes that are directed to the source storage object, tagged with the first tracking ID, and received after the request to create identical snapshots, wherein the second writes are included in the second set of track writes; determining, using the metadata of tracked writes, a second set of locations of the source storage object corresponding to the second set of tracked writes; determining second data changes, that correspond to the second set of locations, from the first replication related snapshot of the source object; replicating the second data changes from the source system to the target system; and applying the second data changes to the target storage object after the second user snapshot of the target storage object is created.

In at least one embodiment, the source storage object can be exposed to the host over one or more first paths between the host and the source system. The one or more first paths can be designated as active where the host can issue I/O requests to the source storage object configured as a first storage object exposed over the one or more first paths. The target storage object can be exposed to the host over one or more second paths between the host and the target system. The one or more second paths can be designated as passive where the host may be unable to issue I/O requests to the target storage object configured as the first storage object exposed over the one or more second paths. The source storage object and the target storage object can be a first resource or object type that is one of a set of predefined types. The first resource or object type can be any of: a volume, a logical device, a file, a directory, and a file system. Tracking writes can be performed by a caching layer, and wherein tracked writes corresponding to the first replication related snapshot of the source storage object can remain in a cache until replicated from the source system to the target system.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
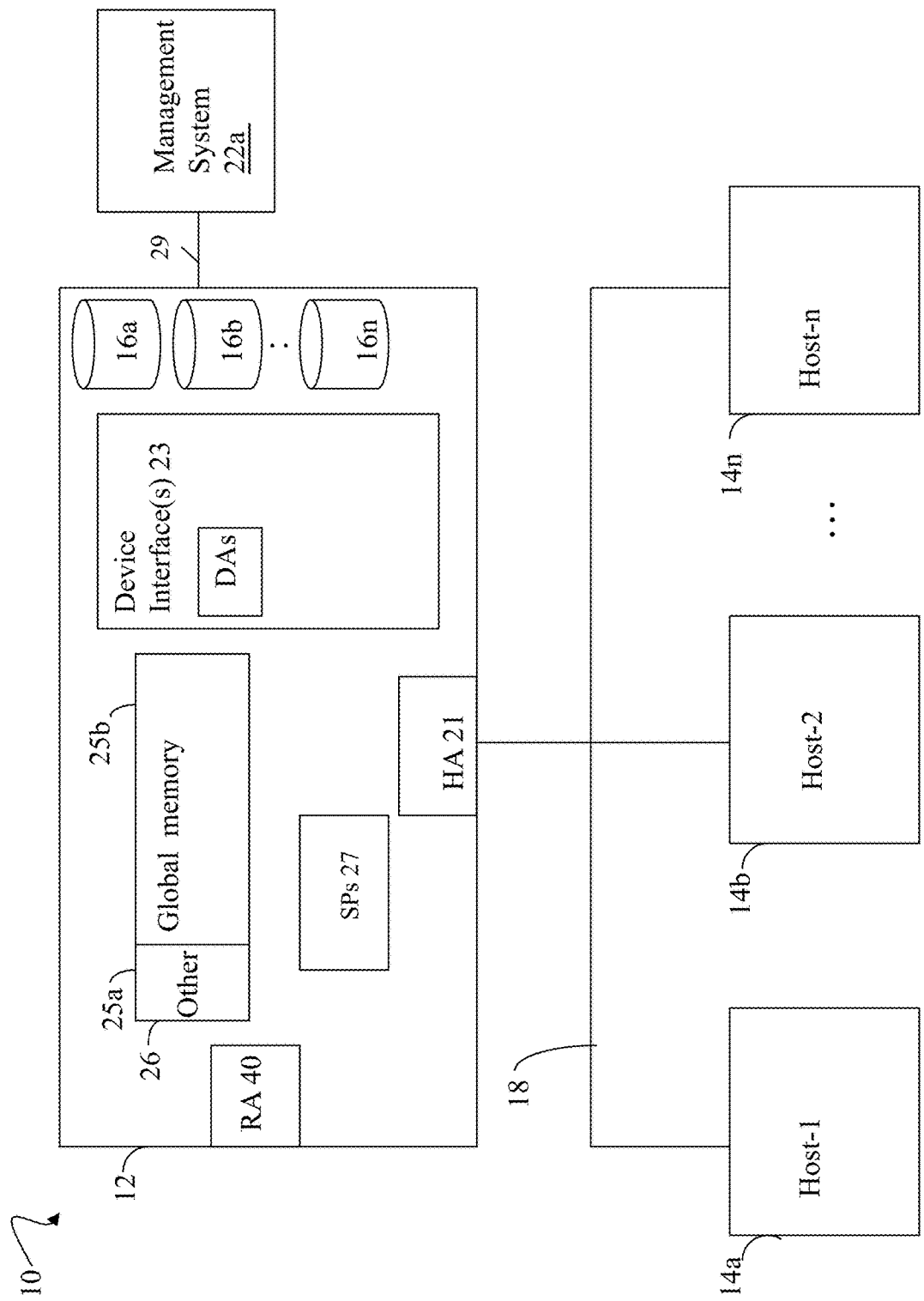
FIG. 1 is an example of components that can be included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system and the target storage system can present a single data storage resource or object, such as a volume or logical device, to a client, such as a host. The volume or other storage resource or object can be configured as a stretched volume or resource, where both the source storage object of the source system and the target storage object of the target system are configured to have the same identity from the perspective of the external host. Thus the stretched volume or resource configured from a pair of local volumes or resources, such as the source storage object of the source storage system and the target storage object of the target storage system, can be configured for remote replication that can be further characterized as one-way replication where, as noted above, writes to the source storage object are automatically replicated in a continuous ongoing manner to the target storage object. The stretched volume, resource or object can be exposed over paths going to both the source storage system and the target storage system, but where the host can only issue I/Os to the stretched volume over paths to the source storage system but not the target storage system.

One mode or methodology of one-way remote replication can be referred to as asynchronous remote replication where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. In at least one existing system, the RPO can be specified at a time granularity that can range from hours to a number of minutes.

It can be desirable to support specifying an even smaller time granularity for an RPO such as less than a minute or a number of seconds. It can further be desirable to provide for efficient asynchronous replication resulting in an RPO that is a number of seconds or generally less than a minute. Furthermore, it can desirable to support efficient creation of customer or user snapshots of a stretched storage object during an active ongoing asynchronous replication session for the stretched storage object. It can be desirable to allow a customer or user to issue a command to take or create a snapshot of the stretched storage object during the active asynchronous replication session established for the stretched storage object, where taking the snapshot of the stretched storage object results in taking identical snapshots of the source storage object and the target storage object configured as the stretched storage object.

In at least one existing system, asynchronous replication can capture data changes or differences to be copied from the source storage object to the target storage object in repeated cycles using a snapshot difference technique. The snapshot difference technique can be utilized where the source system continually takes successive snapshots of the source storage object at a rate or frequency based on the defined RPO. The snapshots can be referred to as replication related snapshots in that they are used only internally in the source system for asynchronous replication purposes. The source system can determine a difference in content between the current snapshot N of the source storage object and the immediately prior snapshot N−1 of the source storage object, where the data changes replicated to the target system correspond to the difference in content between the snapshot N and N−1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

Accordingly, described in the following paragraphs are techniques that can be used for efficient asynchronous replication in at least one embodiment. Additionally in at least one embodiment, the techniques of the present disclosure provide for efficiently creating customer or user requested snapshots of the stretched storage object while one-way asynchronous replication is active, ongoing and established for the stretched storage object. In at least one embodiment, the techniques of the present disclosure can determine data changes or writes that are replicated in a replication cycle without performing the expensive snapshot difference technique. In at least one embodiment, a cache or caching layer can perform write tracking of tagged writes where the cache can identify all writes tagged with a particular tracking identifier (ID). The particular tracking ID can uniquely identify a particular snapshot of a particular source volume, and all writes tracked with the particular tracking ID can denote the data changes extracted from the particular snapshot of the particular source volume for replication to the target system in the replication cycle. Thus in at least one embodiment, the above-noted write tracking can be used to determine corresponding locations in the particular snapshot of the particular source volume of the data changes to be replicated to the target system.

In at least one embodiment, the techniques of the present disclosure provide for taking user snapshots of source and target storage objects configured as a stretched storage object while there is active asynchronous replication session for the stretched storage object. In at least one embodiment, the asynchronous replication session can provide for efficient asynchronous replication for a stretched storage object that results in a very small RPO that is on the scale of a number of seconds or generally less than a minute. For example in at least one embodiment, the RPO can be less than 30 seconds and can sometimes be referred to herein as "near zero" replication using a "near zero" RPO due to the very small RPO. With near zero replication in at least one embodiment, snapshots can be taken in a continuous ongoing manner such that when the data changes of a current snapshot of a source storage object have been replicated or copied from the source to the target system, the source system can take a next snapshot of the source storage object and then replicate the data changes of the next snapshot to the target system. The foregoing can be performed in an ongoing manner in at least one embodiment. In at least one embodiment, rather than taking replication related snapshots at a frequency based on a defined RPO value or setting, the near zero replication can perform asynchronous replication by continually taking snapshots of the source storage object in an ongoing manner and then replicating data changes of the latest snapshot, where taking snapshot N of the source storage object can be triggered by completion of copying or replicating the data changes corresponding to the immediately prior snapshot N−1 of the source storage object. Thus with near zero replication for a stretched storage object in at least one embodiment, once the current replication cycle of data changes is copied or replicated from the source system to the target system, the source system can immediately commence the next replication cycle without regard to taking snapshots at a defined frequency.

In at least one embodiment, the techniques of the present disclosure provide for efficient creation of customer or user snapshots of a stretched storage object during an active ongoing asynchronous replication session for the stretched storage object. In at least one embodiment, a customer or user can issue a request or command to take or create a snapshot of the stretched storage object, exposed as the source object of the source system, during the active asynchronous replication session established for the stretched storage object. In at least one embodiment, taking the user snapshot of the stretched storage object exposed as the source storage object of the source system results in taking identical user snapshots of the source storage object of the source storage system and also the target storage object configured of the target storage system, where the stretched storage object is configured from the source storage object and the target storage object. Put another way in at least one embodiment, taking a first user snapshot of the source storage object can automatically result in taking a second user snapshot of the target storage object, where the first and second user snapshots are identical (e.g., denote identical point in time copies of the stretched storage object or resource).

In at least one embodiment, a user snapshot can be one that is initiated by a user or customer request where the user snapshot can be exposed externally outside the storage systems to the user or customer for any suitable purpose. The user snapshot can be contrasted with a replication related snapshot such as snapshots taken for replication related purposes such as for asynchronous replication. In at least one embodiment, replication related snapshots can be used internally by the source storage system to capture data changes that are copied or replicated in ongoing replication cycles to the target system for a stretched storage object or resource.

In at least one embodiment, creating identical user snapshots of the source and target storage objects comprising the configured stretched storage object can be one of the features customers expect from a replication product. In at least one embodiment, the identical snapshots of the source and target storage objects are byte for byte identical in terms of content, where the source and target storage objects are configured as a stretched storage object in a one way asynchronous replication configuration where writes to the source storage object are automatically replicated to the target storage object such as using near zero replication.

In at least one embodiment, the techniques of the present disclosure provide for efficiently creating user or customer snapshots of the source and target storage objects that are identical while the host continues to send I/Os to the source system that are directed to the stretched storage object (and thus directed to the source object of the source system), and while the asynchronous replication configuration session for the stretched storage object is active and ongoing continually replicating writes of the source object to the target system.

In at least one embodiment, the techniques of the present disclosure can be further extended and applied to groups of stretched storage objects, where a user or customer can create a group level snapshot of a group of stretched storage objects. In at least one embodiment, creating a snapshot of a group of stretched objects can include taking a snapshot of all stretched storage objects of the group in a crash consistent manner such that the snapshots of all storage objects (e.g., source and target storage object) of the group are all crash consistent. With a user snapshot of a group of stretched storage objects configured for asynchronous replication, snapshots can be taken of each pair of source and target storage objects configured as a stretched storage object of the group where the snapshot of the source storage object is identical to the snapshot of the corresponding target storage object.

Different techniques can be used to track data changes of the source storage object on the source system, where such data changes denote written or changed data that is replicated from the source to the remote target system and then applied to the corresponding target storage object.

In at least one embodiment, the techniques of the present disclosure include retaining the changed or written data to be replicated in connection with asynchronous replication for the stretched storage object in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, each replication related snapshot of a particular source storage object can be uniquely identified by a tracking ID used to tag write I/Os corresponding to the particular replication related snapshot of the particular source storage object. In at least one embodiment, the techniques of the present disclosure utilize a mechanism for write tracking of write I/Os in the data path where a cache or caching layer, such as a transactional caching layer, can track tagged write I/Os (e.g., tagged with a tracking ID). In at least one embodiment where the stretched object is a stretched volume, the cache or caching layer of the source storage system can track metadata or information about the tagged write I/Os directed to the stretched object (and thus a corresponding source storage object), where the information can include a volume, offset and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular snapshot of the source storage object, where the particular snapshot of the source storage object can be uniquely mapped to or identified using the particular tracking ID.

Thus in at least one embodiment, the cache can be used to track writes that are directed to a stretched volume and that are tagged with a particular tracking ID, where the tracked writes have corresponding content included in a particular replication related snapshot of the source object uniquely associated with the particular tracking ID. In at least one embodiment, the data changes or differences between a current replication related snapshot N of the source object and a most recent prior replication related snapshot N−1 of the source object can be identified by the tracked writes having a particular tracking ID corresponding to the replication related snapshot N of the source object. In at least one embodiment, data changes corresponding to successive snapshots of the source object can be identified by tracked writes directed to the source object, where such tracked writes can be tagged with corresponding tracking IDs uniquely associated with such successive snapshots of the source object. In at least one embodiment using near zero replication with respect to a stretched volume configured from a source volume and a target volume, tagged writes directed to the source volume can be continuously tracked by the cache of the source system using tracking IDs that correspond uniquely with successively taken snapshots of the source volume.

In at least one embodiment, the foregoing tracking of write I/Os tagged with a tracking ID used in connection with asynchronous replication, and in particular near zero replication, can be further used in connection with the techniques of the present disclosure to provide a solution to take identical user created snapshots of the stretched objects configured from source and target storage objects.

In at least one embodiment for a stretched volume configured for near zero replication that is one way asynchronous replication from a volume pair V1, V2, where V1 is the source volume on the source system and V2 is the target volume on the target system, the caching layer on the source system can track tagged write I/Os directed to the stretched volume, and thus V1, on the source system in connection with replication related snapshots for near zero replication. Additionally for a user created snapshot event in at least one embodiment, information about the user snapshot creation can be placed in the stream of metadata or information corresponding to the tracked tagged write I/Os used in connection with the near zero replication providing asynchronous replication. A snapshot request corresponding to a customer or user's request to create a snapshot of the source volume V1 can be received at the source system and tagged with the current tracking ID of the source volume where the tracking ID also corresponds to a particular replication related snapshot of the source volume. In response to receiving the snapshot request at the source system, the snapshot of the source volume can be taken or created by the data path of the source system and can also trigger creating or taking an identical snapshot of the target volume on the target system. In at least one embodiment, a record denoting the user snapshot creation or request can be placed in the stream of tracked write I/Os where the record includes the current tracking ID as tagged on the snapshot request. When the stream of metadata or information regarding tracked tagged write I/Os for a particular tracking ID is processed to replicate corresponding data changes or content to the target system for a replication related snapshot, a record regarding the user snapshot creation can be detected in the stream. In response to detecting the user snapshot creation record, the stream of data changes can be paused while the user or customer snapshot is created on the target system. Subsequently, the replication of writes or data changes corresponding to the stream can resume.

In at least one embodiment, near zero replication with respect to a stretched volume or resource can denote one way asynchronous replication from a source volume of a source system to a corresponding target volume of a target system. In at least one embodiment, near zero replication for a stretched volume can replicate source volume data changes to the target system continuously such that as soon as one replication cycle ends, the next replication cycle begins. With near zero replication in at least one embodiment, the cache can track tagged writes that are tagged with a tracking ID. In at least one embodiment, tracking writes can include recording information about the tagged writes such as volume, offset and length corresponding to the writes. In at least one embodiment, the tracking ID can be uniquely associated with a particular replication related snapshot of a particular source volume configured for near zero replication. In this manner, querying the cache for tracked writes tagged with a particular tracking ID can denote the writes or data changes included in a particular corresponding replication related snapshot of a particular source volume.

In at least one embodiment, a request can be received at a source system to create or take a user snapshot of a stretched volume configured for near zero replication. In response to receiving the request, a first user snapshot of the source volume can be created on the source system. Additionally, a record, indicator or marker denoting creation of a user snapshot of a stretched volume (and thus source volume per the request) can be included in the same stream of tracked writes associated with a replication cycle corresponding to a particular replication related snapshot of the source volume. The stream can include tracked writes and any user snapshot creation requests in time order. When processing the stream of writes in connection with a replication cycle of near zero replication, the record corresponding to the user snapshot creation request can be detected. In response to detecting the record, processing of the stream of writes in connection with near zero replication can be paused. After pausing, a second user snapshot of the corresponding target volume configured for the stretched volume can be created on the target system. The first user snapshot of the source volume and the second user snapshot of the target volume can be identical. After creating the second user snapshot of the target volume, processing of the stream of tracked writes for the replication cycle of near zero replication can continue.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
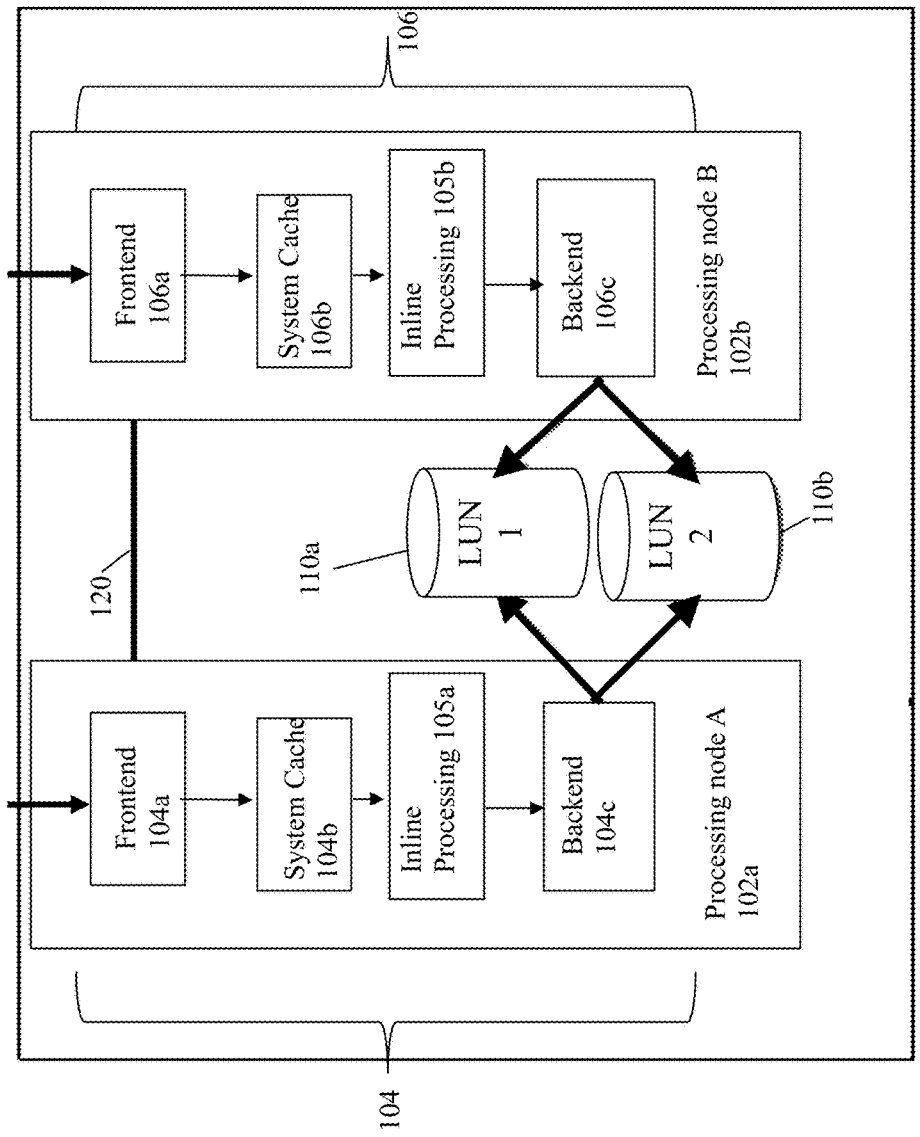
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
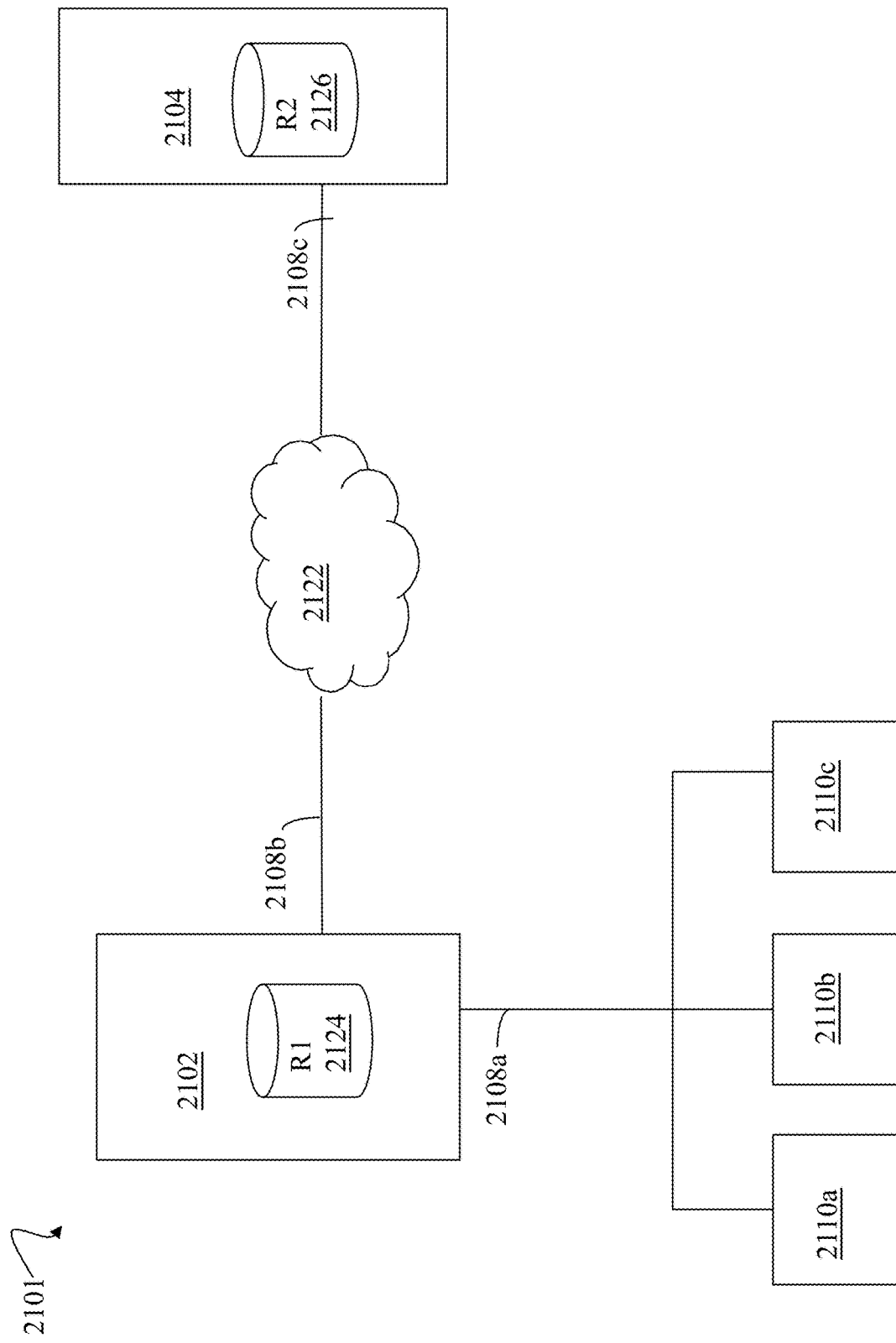
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110a can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110a regarding completion of the write. Thus, the acknowledgement sent from the system 2102 to the host 2110a regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108b, 2122, and 2108c, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
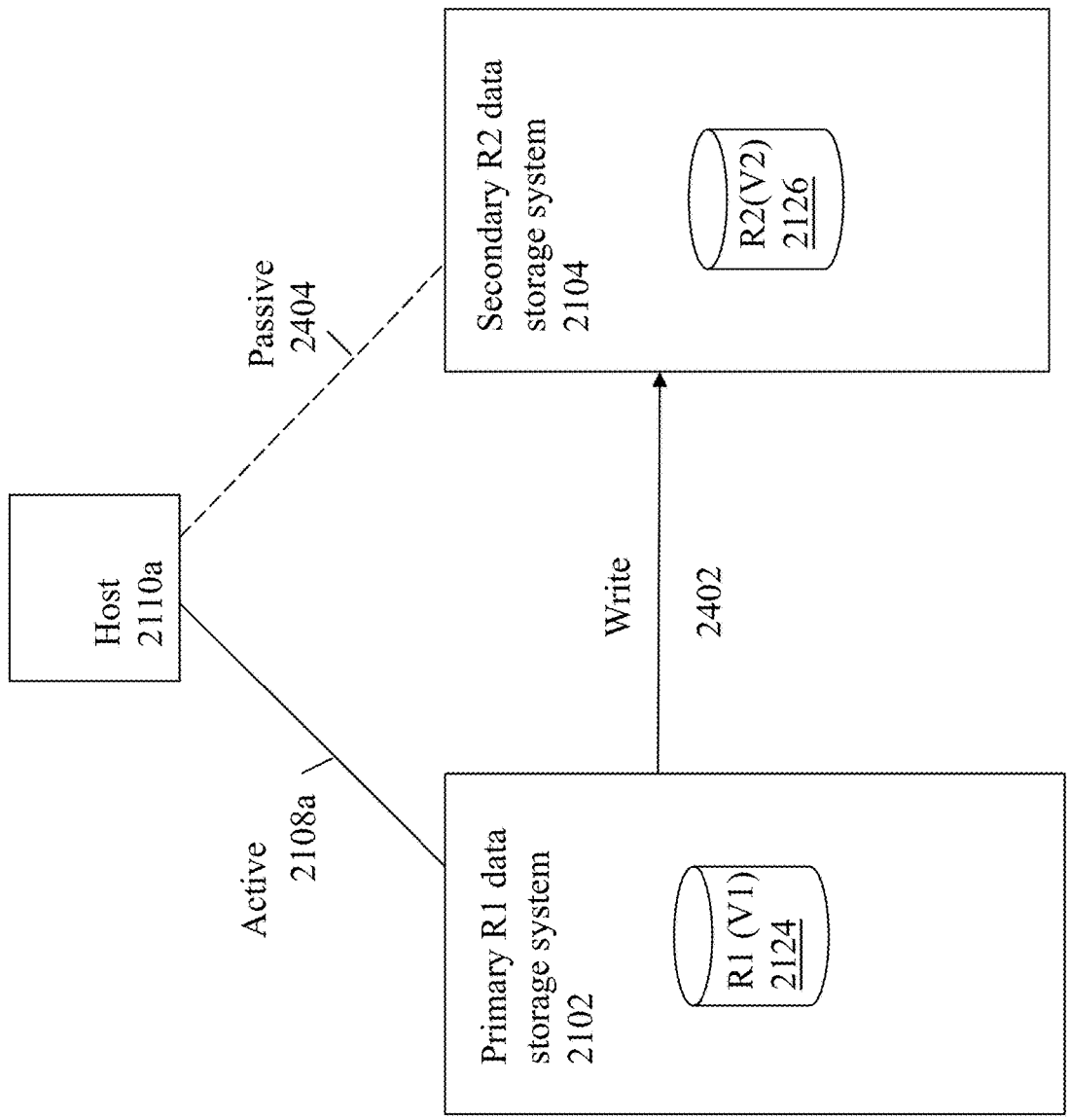
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with asynchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be asynchronously replicated to the R2 system 2104.

In at least one embodiment of the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A for I/Os over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A. Alternatively, recovery processing can include copying content from R2 device 2126 of the R2 system 2104 to the R1 device 2124 of the R1 system 2102 to thereby restore R1 2124. Subsequent to restoring R1 2124, the host 2110a can resume issuing I/Os to R1 2124 over path 2108a where any write I/Os directed to R1 2124 can be replicated and applied in an asynchronous manner to R2 2126 on the storage system 2104.

In at least one embodiment, the pair of devices or volumes including the R1 device 2124 and the R2 device 2126 can be configured as the same single volume or LUN, such as LUN A, to expose the two different devices or volumes (e.g., V1 or R1 2124; V2 or R2 2326), on two different data storage systems 2102, 2104 to the host 2110a as the same single volume or LUN. Thus, from the view of the host 2110a, the same LUN A is exposed and thus discoverable over the two paths 2108a and 2404, where R1/V1 and R2/V2 are both configured as the same logical volume or LUN A and where R1/V1 and R2/V2 both have the same identity as presented, viewed or exposed to an external host. However in at least one embodiment, host I/Os directed to LUN A sent over active path 2108a can be serviced, and where host I/Os directed to LUN A may not be sent over passive path 2404 and may not be serviced.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, one or more file systems, a virtual volume or vvol used in connection with virtual machines, one or more files, one or more directories of files or other object, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

As discussed above, data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system and the target storage system can present a single data storage resource or object, such as a volume or logical device, to a client, such as a host. The volume or other storage resource or object can be configured as a stretched volume or resource, where both the source storage object of the source system and the target storage object of the target system are configured to have the same identity from the perspective of the external host. Thus the stretched volume or resource configured from a pair of local volumes or resources, such as the source storage object of the source storage system and the target storage object of the target storage system, can be configured for remote replication that can be further characterized as one-way replication where, as noted above, writes to the source storage object are automatically replicated in a continuous ongoing manner to the target storage object. The stretched volume, resource or object can be exposed over paths going to both the source storage system and the target storage system, but where the host can only issue I/Os to the stretched volume over paths to the source storage system but not the target storage system.

One mode or methodology of one-way remote replication can be referred to as asynchronous remote replication where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. In at least one existing system, the RPO can be specified at a time granularity that can range from hours to a number of minutes.

It can be desirable to support specifying an even smaller time granularity for an RPO such as less than a minute or a number of seconds. It can further be desirable to provide for efficient asynchronous replication resulting in an RPO that is a number of seconds or generally less than a minute. Furthermore, it can desirable to support efficient creation of customer or user snapshots of a stretched storage object during an active ongoing asynchronous replication session for the stretched storage object. It can be desirable to allow a customer or user to issue a command to take or create a snapshot of the stretched storage object during the active asynchronous replication session established for the stretched storage object, where taking the snapshot of the stretched storage object results in taking identical snapshots of the source storage object and the target storage object configured as the stretched storage object.

In at least one existing system, asynchronous replication can capture data changes or differences to be copied from the source storage object to the target storage object in repeated cycles using a snapshot difference technique. The snapshot difference technique can be utilized where the source system continually takes successive snapshots of the source storage object at a rate or frequency based on the defined RPO. The snapshots can be referred to as replication related snapshots in that they are used only internally in the source system for asynchronous replication purposes. The source system can determine a difference in content between the current snapshot N of the source storage object and the immediately prior snapshot N-1 of the source storage object, where the data changes replicated to the target system correspond to the difference in content between the snapshot N and N-1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

Accordingly, described in the following paragraphs are techniques that can be used for efficient asynchronous replication in at least one embodiment. Additionally in at least one embodiment, the techniques of the present disclosure provide for efficiently creating customer or user requested snapshots of the stretched storage object while one-way asynchronous replication is active, ongoing and established for the stretched storage object. In at least one embodiment, the techniques of the present disclosure can determine data changes or writes that are replicated in a replication cycle without performing the expensive snapshot difference technique. In at least one embodiment, a cache or caching layer can perform write tracking of tagged writes where the cache can identify all writes tagged with a particular tracking identifier (ID). The particular tracking ID can uniquely identify a particular snapshot of a particular source volume, and all writes tracked with the particular tracking ID can denote the data changes extracted from the particular snapshot of the particular source volume for replication to the target system in the replication cycle. Thus in at least one embodiment, the above-noted write tracking can be used to determine corresponding locations in the particular snapshot of the particular source volume of the data changes to be replicated to the target system.

In at least one embodiment, the techniques of the present disclosure provide for taking user snapshots of source and target storage objects configured as a stretched storage object while there is active asynchronous replication session for the stretched storage object. In at least one embodiment, the asynchronous replication session can provide for efficient asynchronous replication for a stretched storage object that results in a very small RPO that is on the scale of a number of seconds or generally less than a minute. For example in at least one embodiment, the RPO can be less than 30 seconds and can sometimes be referred to herein as "near zero" replication using a "near zero" RPO due to the very small RPO. With near zero replication in at least one embodiment, snapshots can be taken in a continuous ongoing manner such that when the data changes of a current snapshot of a source storage object have been replicated or copied from the source to the target system, the source system can take a next snapshot of the source storage object and then replicate the data changes of the next snapshot to the target system. The foregoing can be performed in an ongoing manner in at least one embodiment. In at least one embodiment, rather than taking replication related snapshots at a frequency based on a defined RPO value or setting, the near zero replication can perform asynchronous replication by continually taking snapshots of the source storage object in an ongoing manner and then replicating data changes of the latest snapshot, where taking snapshot N of the source storage object can be triggered by completion of copying or replicating the data changes corresponding to the immediately prior snapshot N-1 of the source storage object. Thus with near zero replication for a stretched storage object in at least one embodiment, once the current replication cycle of data changes is copied or replicated from the source system to the target system, the source system can immediately commence the next replication cycle without regard to taking snapshots at a defined frequency.

In at least one embodiment, the techniques of the present disclosure provide for efficient creation of customer or user snapshots of a stretched storage object during an active ongoing asynchronous replication session for the stretched storage object. In at least one embodiment, a customer or user can issue a request or command to take or create a snapshot of the stretched storage object, exposed as the source object of the source system, during the active asynchronous replication session established for the stretched storage object. In at least one embodiment, taking the user snapshot of the stretched storage object exposed as the source storage object of the source system results in taking identical user snapshots of the source storage object of the source storage system and also the target storage object configured of the target storage system, where the stretched storage object is configured from the source storage object and the target storage object. Put another way in at least one embodiment, taking a first user snapshot of the source storage object can automatically result in taking a second user snapshot of the target storage object, where the first and second user snapshots are identical (e.g., denote identical point in time copies of the stretched storage object or resource).

In at least one embodiment, a user snapshot can be one that is initiated by a user or customer request where the user snapshot can be exposed externally outside the storage systems to the user or customer for any suitable purpose. The user snapshot can be contrasted with a replication related snapshot such as snapshots taken for replication related purposes such as for asynchronous replication. In at least one embodiment, replication related snapshots can be used internally by the source storage system to capture data changes that are copied or replicated in ongoing replication cycles to the target system for a stretched storage object or resource.

In at least one embodiment, creating identical user snapshots of the source and target storage objects comprising the configured stretched storage object can be one of the features customers expect from a replication product. In at least one embodiment, the identical snapshots of the source and target storage objects are byte for byte identical, where the source and target storage objects are configured as a stretched storage object in a one way asynchronous replication configuration where writes to the source storage object are automatically replicated to the target storage object such as using near zero replication.

In at least one embodiment, the techniques of the present disclosure provide for efficiently creating user or customer snapshots of the source and target storage objects that are identical while the host continues to send I/Os to the source system that are directed to the stretched storage object (and thus directed to the source object of the source system), and while the asynchronous replication configuration session for the stretched storage object is active and ongoing continually replicating writes of the source object to the target system.

In at least one embodiment, the techniques of the present disclosure can be further extended and applied to groups of stretched storage objects, where a user or customer can create a group level snapshot of a group of stretched storage objects. In at least one embodiment, creating a snapshot of a group of stretched objects can include taking a snapshot of all stretched storage objects of the group in a crash consistent manner such that the snapshots of all storage objects (e.g., source and target storage object) of the group are all crash consistent. With a user snapshot of a group of stretched storage objects configured for asynchronous replication, snapshots can be taken of each pair of source and target storage objects configured as a stretched storage object of the group where the snapshot of the source storage object is identical to the snapshot of the corresponding target storage object.

Different techniques can be used to track data changes of the source storage object on the source system, where such data changes denote written or changed data that is replicated from the source to the remote target system and then applied to the corresponding target storage object.

In at least one embodiment, the techniques of the present disclosure include retaining the changed or written data to be replicated in connection with asynchronous replication for the stretched storage object in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, each replication related snapshot of a particular source storage object can be uniquely identified by a tracking ID used to tag write I/Os corresponding to the particular replication related snapshot of the particular source storage object. In at least one embodiment, the techniques of the present disclosure utilize a mechanism for write tracking of write I/Os in the data path where a cache or caching layer, such as a transactional caching layer, can track tagged write I/Os (e.g., tagged with a tracking ID). In at least one embodiment where the stretched object is a stretched volume, the cache or caching layer of the source storage system can track metadata or information about the tagged write I/Os directed to the stretched object (and thus a corresponding source storage object), where the information can include a volume, offset and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular snapshot of the source storage object, where the particular snapshot of the source storage object can be uniquely mapped to or identified using the particular tracking ID.

Thus in at least one embodiment, the cache can be used to track writes that are directed to a stretched volume and that are tagged with a particular tracking ID, where the tracked writes have corresponding content included in a particular replication related snapshot of the source object uniquely associated with the particular tracking ID. In at least one embodiment, the data changes or differences between a current replication related snapshot N of the source object and a most recent prior replication related snapshot N−1 of the source object can be identified by the tracked writes having a particular tracking ID corresponding to the replication related snapshot N of the source object. In at least one embodiment, data changes corresponding to successive snapshots of the source object can be identified by tracked writes directed to the source object, where such tracked writes can be tagged with corresponding tracking IDs uniquely associated with such successive snapshots of the source object. In at least one embodiment using near zero replication with respect to a stretched volume configured from a source volume and a target volume, tagged writes directed to the source volume can be continuously tracked by the cache of the source system using tracking IDs that correspond uniquely with successively taken snapshots of the source volume.

In at least one embodiment, the foregoing tracking of write I/Os tagged with a tracking ID used in connection with asynchronous replication, and in particular near zero replication, can be further used in connection with the techniques of the present disclosure to provide a solution to take identical user created snapshots of the stretched objects configured from source and target storage objects.

In at least one embodiment for a stretched volume configured for near zero replication that is one way asynchronous replication from a volume pair V1, V2, where V1 is the source volume on the source system and V2 is the target volume on the target system, the caching layer on the source system can track tagged write I/Os directed to the stretched volume, and thus V1, on the source system in connection with replication related snapshots for near zero replication. Additionally for a user created snapshot event in at least one embodiment, information about the user snapshot creation can be placed in the stream of metadata or information corresponding to the tracked tagged write I/Os used in connection with the near zero replication providing asynchronous replication. A snapshot request corresponding to a customer or user's request to create a snapshot of the source volume V1 can be received at the source system and tagged with the current tracking ID of the source volume where the tracking ID also corresponds to a particular replication related snapshot of the source volume. In response to receiving the snapshot request at the source system, the snapshot of the source volume can be taken or created by the data path of the source system and can also trigger creating or taking an identical snapshot of the target volume on the target system. In at least one embodiment, a record denoting the user snapshot creation or request can be placed in the stream of tracked write I/Os where the record includes the current tracking ID as tagged on the snapshot request. When the stream of metadata or information regarding tracked tagged write I/Os for a particular tracking ID is processed to replicate corresponding data changes or content to the target system for a replication related snapshot, a record regarding the user snapshot creation can be detected in the stream. In response to detecting the user snapshot creation record, the stream of data changes can be paused while the user or customer snapshot is created on the target system. Subsequently, the replication of writes or data changes corresponding to the stream can resume.

In at least one embodiment, near zero replication with respect to a stretched volume or resource can denote one way asynchronous replication from a source volume of a source system to a corresponding target volume of a target system. In at least one embodiment, near zero replication for a stretched volume can replicate source volume data changes to the target system continuously such that as soon as one replication cycle ends, the next replication cycle begins. With near zero replication in at least one embodiment, the cache can track tagged writes that are tagged with a tracking ID. In at least one embodiment, tracking writes can include recording information about the tagged writes such as volume, offset and length corresponding to the writes. In at least one embodiment, the tracking ID can be uniquely associated with a particular replication related snapshot of a particular source volume configured for near zero replication. In this manner, querying the cache for tracked writes tagged with a particular tracking ID can denote the writes or data changes included in a particular corresponding replication related snapshot of a particular source volume.

In at least one embodiment, a request can be received at a source system to create or take a user snapshot of a stretched volume configured for near zero replication. In response to receiving the request, a first user snapshot of the source volume can be created on the source system. Additionally, a record, indicator or marker denoting creation of a user snapshot of a stretched volume (and thus source volume per the request) can be included in the same stream of tracked writes associated with a replication cycle corresponding to a particular replication related snapshot of the source volume. The stream can include tracked writes and any user snapshot creation requests in time order. When processing the stream of writes in connection with a replication cycle of near zero replication, the record corresponding to the user snapshot creation request can be detected. In response to detecting the record, processing of the stream of writes in connection with near zero replication can be paused. After pausing, a second user snapshot of the corresponding target volume configured for the stretched volume can be created on the target system. The first user snapshot of the source volume and the second user snapshot of the target volume can be identical. After creating the second user snapshot of the target volume, processing of the stream of tracked writes for the replication cycle of near zero replication can continue.

The foregoing and other aspects of the techniques of the present disclosure are described in more detail in the following paragraphs.

Described in the following paragraphs are techniques of the present disclosure that can be used for efficient asynchronous replication and taking or creating a user snapshot of a stretched volume, resource or object in at least one embodiment. The asynchronous replication configuration can be generally as discussed herein such as the asynchronous remote replication configuration as in FIG. 4. In at least one embodiment, the asynchronous replication configuration can be a near zero replication configuration of a stretched volume.

Figure 5:
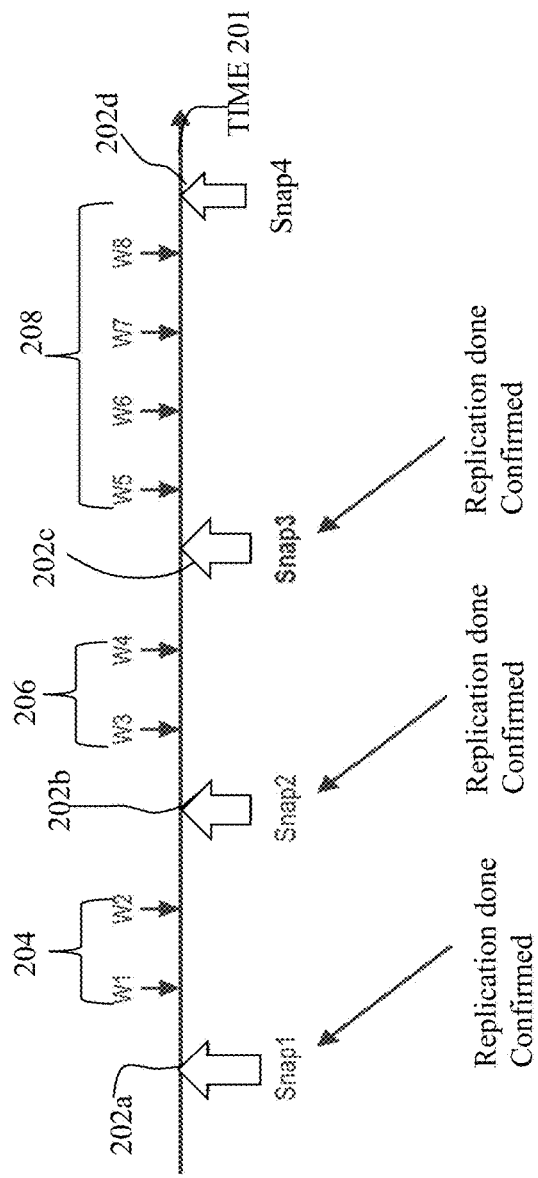
FIG. 5 is an example illustrating determining data differences for a replication configuration in at least one embodiment in accordance with the techniques of the present disclosure.

Referring to FIG. 5, shown is an example 200 illustrating use of replication related or transient snapshots in connection with asynchronous replication, such as a near zero replication for a stretched volume, in at least one embodiment in accordance with the techniques of the present disclosure.

The example 200 illustrates replication related snapshots 202a-d of a storage object such as a source volume of a source storage system taken at various points in time along a timeline 201. The snapshot snap1 202a is taken at a first point in time P1 and can be marked as a replication related snapshot. The snapshot snap2 202b is taken at a second point in time P2 (subsequent to taking snap1 202a at P1) and can be marked as a replication related snapshot. The snapshot snap3 202c is taken at a third point in time P3 (subsequent to taking snap2 202b at P2) and can be marked as a replication related snapshot. The snapshot snap4 202d is taken at a fourth point in time P4 (subsequent to taking snap3 202c at P3). The writes W1 and W2 of 204 denote the writes occurring between taking snapshots 202a and 202b, whereby writes of 204 denote data changes between snapshots 202a-b. The writes W3 and W4 of 206 denote the writes occurring between taking snapshots 202b and 202c, whereby the writes of 206 denote data changes between snapshots 202b-c. The writes W5-W8 of 208 denote the writes occurring between taking snapshots 202c and 202d whereby the writes of 208 denote data changes between the snapshots 202c-d.

The writes 204 can denote the replicated writes of a single asynchronous replication cycle having corresponding content included in the snapshot 202b; the writes 206 can denote the replicated writes of a single asynchronous replication cycle having corresponding content included in the snapshot 202c; and the writes 208 can denote the replicated writes of a single asynchronous replication cycle having corresponding content included in the snapshot 202d.

Consistent with discussion elsewhere in at least one embodiment in accordance with the techniques of the present disclosure, write tracking can be performed by a caching layer or cache to determine the replicated writes of each replication cycle corresponding to a particular tracking ID that uniquely identifies a particular replication related snapshot. Processing can be performed to extract data changes of a replication cycle from a particular replication related snapshot based on the tracked writes with the particular tracking ID as identified by the caching layer.

Consistent with other discussion herein in connection with at least one embodiment in accordance with the techniques of the present disclosure, records of the writes 204 of can remain in the cache until the writes 204 have been replicated from the source system to the target system whereby the replication of such subsequent writes 204 following the snap 202a are confirmed as committed on the target system. Records of the writes 206 can remain in the cache until the writes 206 have been replicated from the source system to the target system whereby the replication of such subsequent writes 206 following the snap 202b are confirmed as committed on the target system. Records of the writes 208 can remain in the cache until the writes 208 have been replicated from the source system to the target system whereby the replication of such subsequent writes 208 following the snap 202c are confirmed as committed on the target system.

In at least one embodiment, the replication snapshot operation N and all subsequent writes prior to the next successive replication snapshot N+1 taken for replication can be held or retained in the cache until all such subsequent writes have been replicated to the target system where the target system has confirmed or acknowledged the replication of such writes.

In at least one embodiment, the control path can generally control and orchestrate asynchronous replication for an asynchronous replication configuration such as illustrated in FIG. 4. In at least one embodiment, the control path can instruct the data path to perform the asynchronous replication. In at least one embodiment, the control path of the source system can include an orchestrator component that orchestrates or controls the asynchronous replication such as for a near zero asynchronous replication configuration of a stretched volume. Additionally in at least one embodiment, the orchestrator can manage replication related snapshots and associated asynchronous replication processing, controls I/O tagging, and other processing discussed in more detail below.

In at least one embodiment, the data path can generally track data changes of the source volume or storage object on the source system, where the tracked changes are those that need to be replicated to the target volume or storage object of the target system. In at least one embodiment, such data changes can be read from a replication related snapshot of the source volume and written to the target volume of the target system on each replication cycle.

In at least one embodiment, a namespace component can provide interfaces for reading and writing data. In at least one embodiment, the namespace component can be a logical volume manager or LVM that exports or provides access to volumes, maintains snapshots, and the like. In at least one embodiment, asynchronous replication processing can track data changes, such as noted above, using snapshots of a source volume or object and by performing write tracking by a caching layer or component.

In at least one embodiment, a Txcache or transaction cache component can handle loading content or data read from BE PDs (e.g., BE non-volatile storage) into cache pages. More generally, the Txcache can denote a caching layer or component that manages the cache and ensures that requested data such as for a read request is in cache.

The above-noted components as well as others in at least one embodiment are discussed in more detail below.

Figure 6:
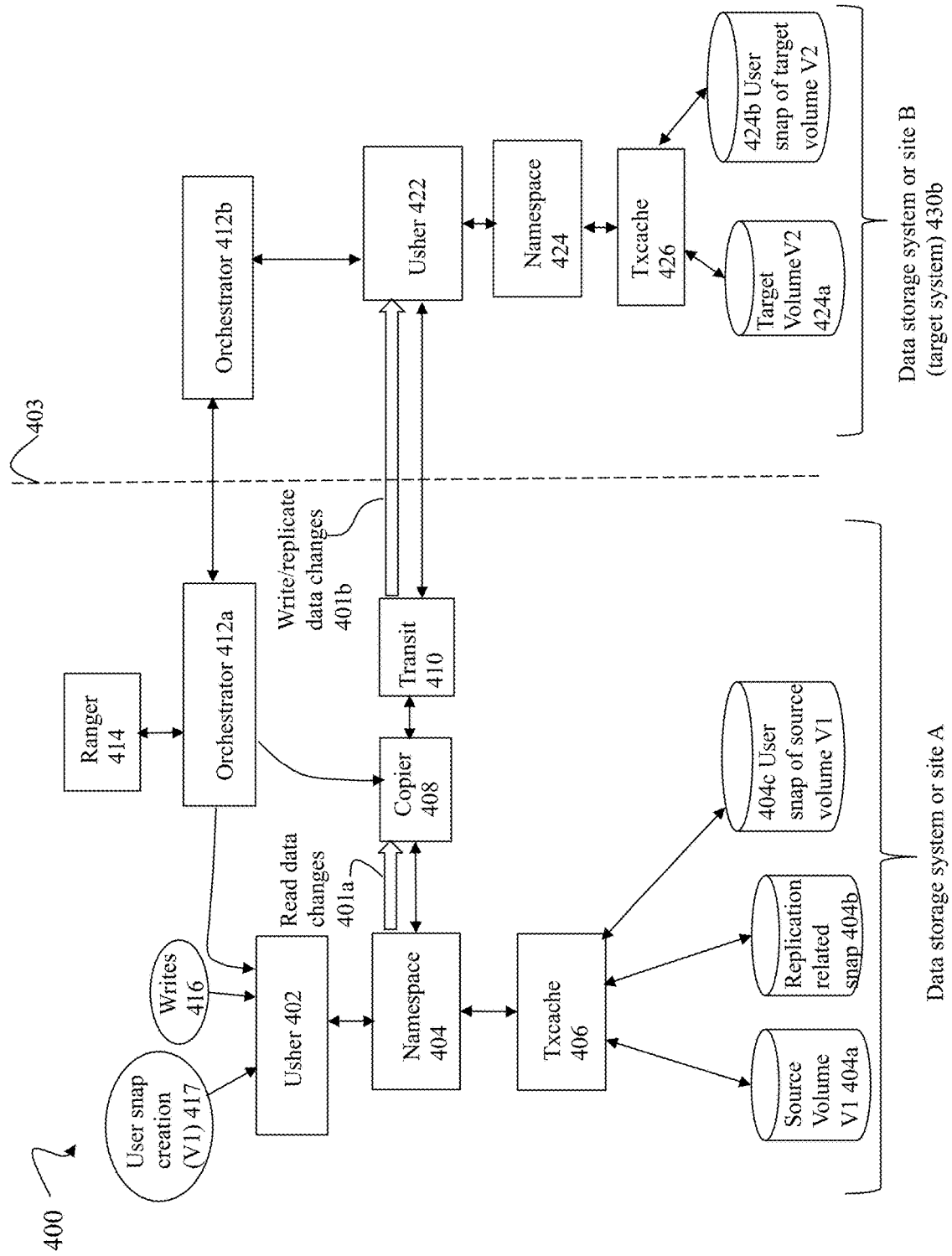
FIG. 6 is an example illustrating components in at least one embodiment used in connection with taking user snapshots of source and target volumes of an asynchronous replication configuration while a replication session of a stretched volume configured from the source and target volumes is active in at least one embodiment in accordance with the techniques of the present disclosure.

Referring to FIG. 6, shown is an example 400 of components in at least one embodiment in accordance with the techniques of the present disclosure. The example 400 illustrates components and associated data and processing flows for at least one embodiment in connection with taking or creating user snapshots of a source volume and a target volume while there is an active asynchronous replication session with writes directed to the source volume being asynchronously replicated to the target volume.

The example 400 includes source system 430a and target system 430b. Components to the left of line 403 can be included in the source system 430a and components to the right of the line 403 can be included in the target system 430b. In at least one embodiment, an asynchronous replication configuration can be a near zero replication configuration that asynchronously replicates data changes or writes made to source volume V2 404a to the target volume V2 404b. In at least one embodiment, processing can include continually taking replication related snapshots or snaps; tracking writes of each replication related snapshot using a tracking ID uniquely associated with the replication related snapshot; using metadata or information recorded for the tracked writes to determine a set of corresponding locations in the replication related snapshot; extracting data changes of the corresponding locations from the replication related snapshot; and replicating the data changes of the replication related snapshot corresponding to a replication cycle from the source system 430a to the target system 430b. The data differences or changes can be read, such as from a replication related snapshot or snap 404b, and then replicated or written to the target system 430b and applied to the corresponding target volume 424a. In at least one embodiment, data differences or data changes can be included in one of replication related snapshots such as 404b.

The source system 430a can include the following components: usher 402, namespace 404, Txcache 406, copier 408, transit 410, orchestrator 412a, ranger 414, source volume V1 404a, replication related snapshot (snap) 404b, and user snap 404c of the source volume V1. The target system can include the following components: orchestrator 412b, usher 422, namespace 424, Txcache 426, target volume V2 424a, and user snap 424b of the target volume V2. Embodiments can include other components than those illustrated herein for purposes of asynchronous replication workflow and taking user snapshots. In at least one embodiment, instances of usher 402, 422 can be generally I/O handlers respectively of the source and target systems 430a-b. Instances of namespace 404, 424 can be LVMs respectively of the source and target systems 430a-b. Instances of Txcache 406, 426 can be cache managers respectively of the source and target systems 430a-b. Copier 408 can control the copying of data changes of asynchronous replication from the source system 430a to the target system 430b. In particular, copier 408 can read 401a data changes via requests or calls to namespace 404. Copier 408 can then provide the data changes read to the transit component 410 that writes or replicates 401b the data changes to the target system 430b. In this example 400, the replicated data changes 401b can be received by usher 422 that can write the data changes to the target volume 424a via write operations or requests issued to namespace 424.

In at least one embodiment, the components 402, 404 and 406 can be included in the data path on the source system 430a, and the component 422, 424, and 426 can be included in the data path on the target system 430b.

In at least one embodiment, the orchestrator component 412a of the source system 430a can orchestrate or control the asynchronous replication such as for a near zero asynchronous replication configuration of a stretched volume configured from the source volume V1 404a and target volume V2 404b. Additionally in at least one embodiment, the orchestrator 412a can manage replication related snapshots and associated asynchronous replication processing, control I/O tagging, and other processing discussed in more detail below. The orchestrator component 412a can communicate with the orchestrator component 412b of the target system 430b to initiate creating or taking the user snap 424b of the target volume V2 424b.

In at least one embodiment, the ranger component 414 can perform processing including querying the Txcache 406 for metadata or information on tracked writes and any tracked user snapshot creation requests tagged with a particular tracking ID corresponding to the replication related snapshot 404b of V1 404a. The metadata or information can include LBA or offset and length information corresponding to the tracked writes. Additionally, the metadata or information can include a record or indicator denoting a user snapshot creation request received at the source system to create or take a user snapshot of the stretched volume, and thus, V1 404a. Ranger can use the offset and length information to determine contiguous regions of the logical address space of V1 404a. The contiguous regions can denote the offsets or locations written to be the tracked writes with the particular tracking ID. The contiguous regions can denote the locations of the data changes or differences to be read from the replication related snap 404b, replicated to the target system 430b, and applied to the target volume V2 424a. Ranger 414 can provide the locations and offsets of the contiguous regions to the orchestrator 412a for use in replicating or copying the data changes of the replication related snap 404b for the current replication cycle to the target system 430b.

Additionally in at least one embodiment, ranger 414 can perform processing to detect any occurrence of a record or indicator denoting a request to create a user snapshot of the stretched volume or V1 404*a* as noted above. In response to detecting the occurrence of the record denoting the user snapshot creation request, ranger 414 can pause processing of the replication stream of metadata or information of the tracked writes to handle creation of the user snap 424*b* of V2 on the target system. In particular, ranger 414 can provide the orchestrator 412*a* with a first portion of location information regarding data changes of the replication related snap 404*b* to be applied to V2 424*a* prior to creating the user snap 424*b* of V2; provide orchestrator 412*a* with an indication that the user snap 424*b* of V2 needs to be created on the target system 430*b* after applying the data changes denoted by the first portion of location information; and provide orchestrator 412*a* with an indication that a subsequent communication will be sent that includes a second portion of remaining location information regarding data changes of the replication related snap 404*b* to be replicated to the target system 430*b* and applied to V2 424*a* for the current replication cycle. Data changes corresponding to the second portion of remaining location information correspond to tracked writes of V1 404*a* with the particular tracking ID that occurred in time after the user snapshot creation request was received. Accordingly, such data changes for writes of V1 404*a* received after the user snapshot creation request are not included in the created identical snapshots 404*c*, 424*b*.

The following paragraphs provide additional detail regarding processing that can be performed by components of the example 400 in at least one embodiment in accordance with the techniques of the present disclosure.

Figure 7A:
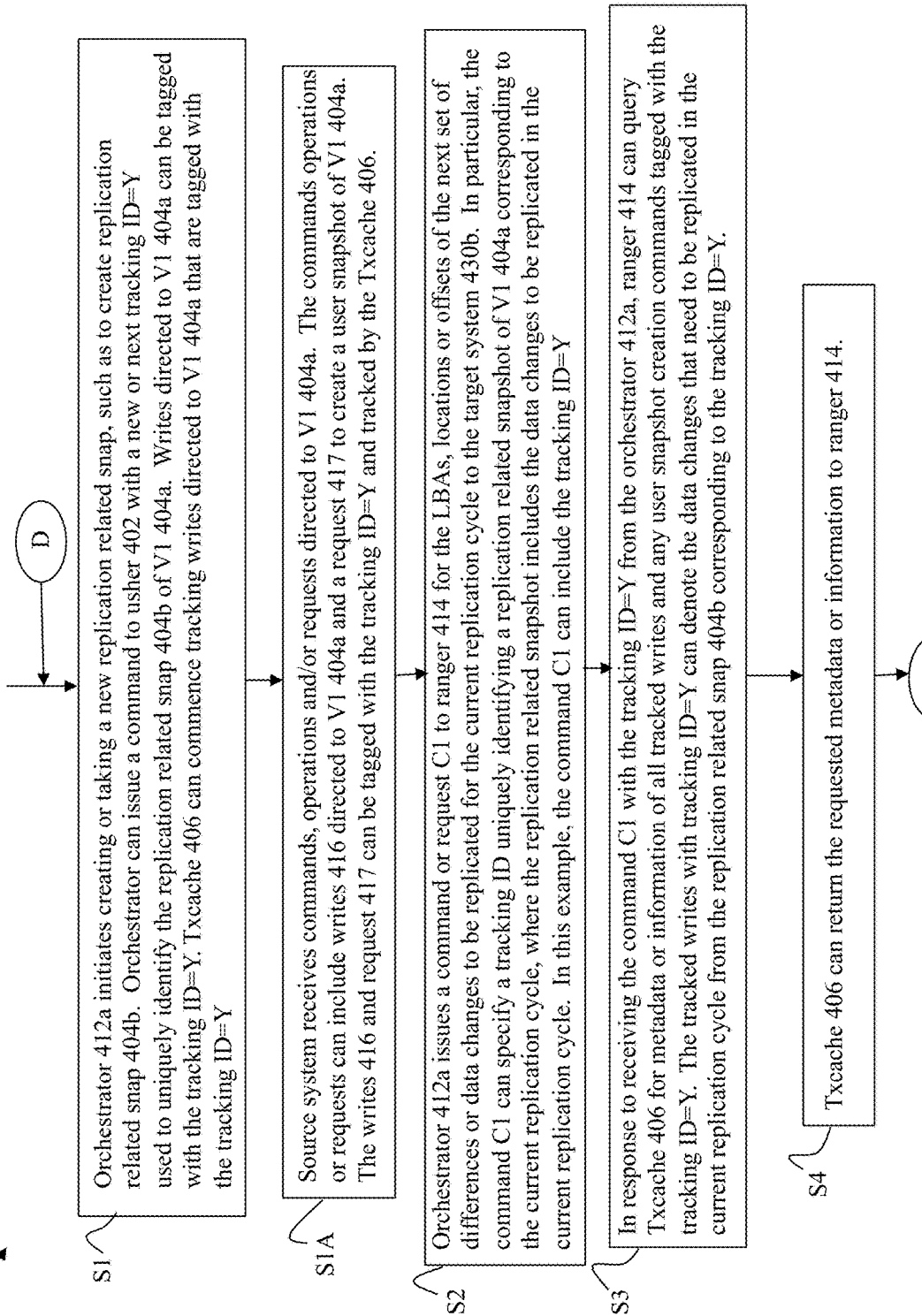
FIGS. 7A-7C are processing steps of a flowchart that can be performed in at least one embodiment in accordance with the techniques of the present disclosure.
Figure 7B:
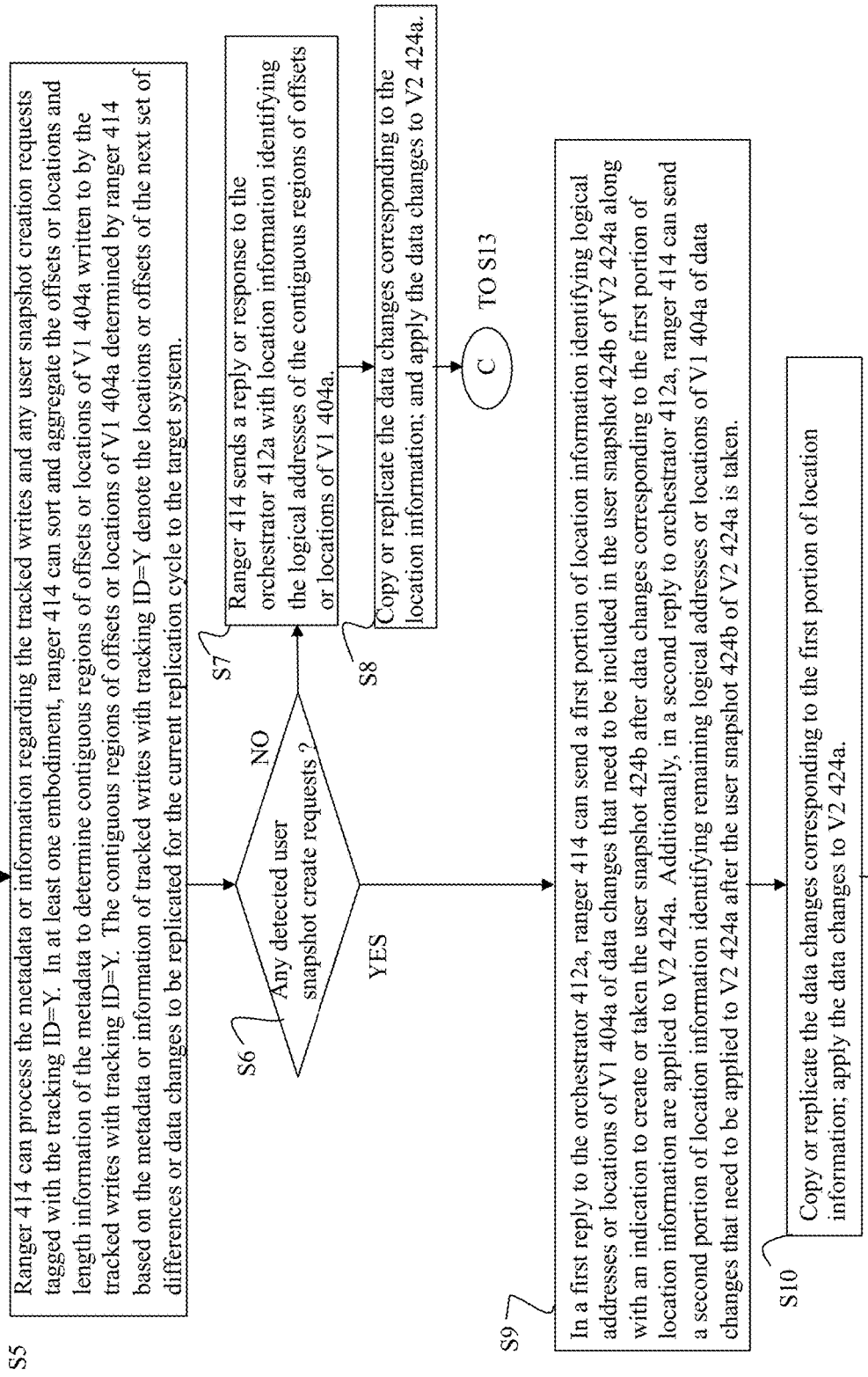
Figure 7C:
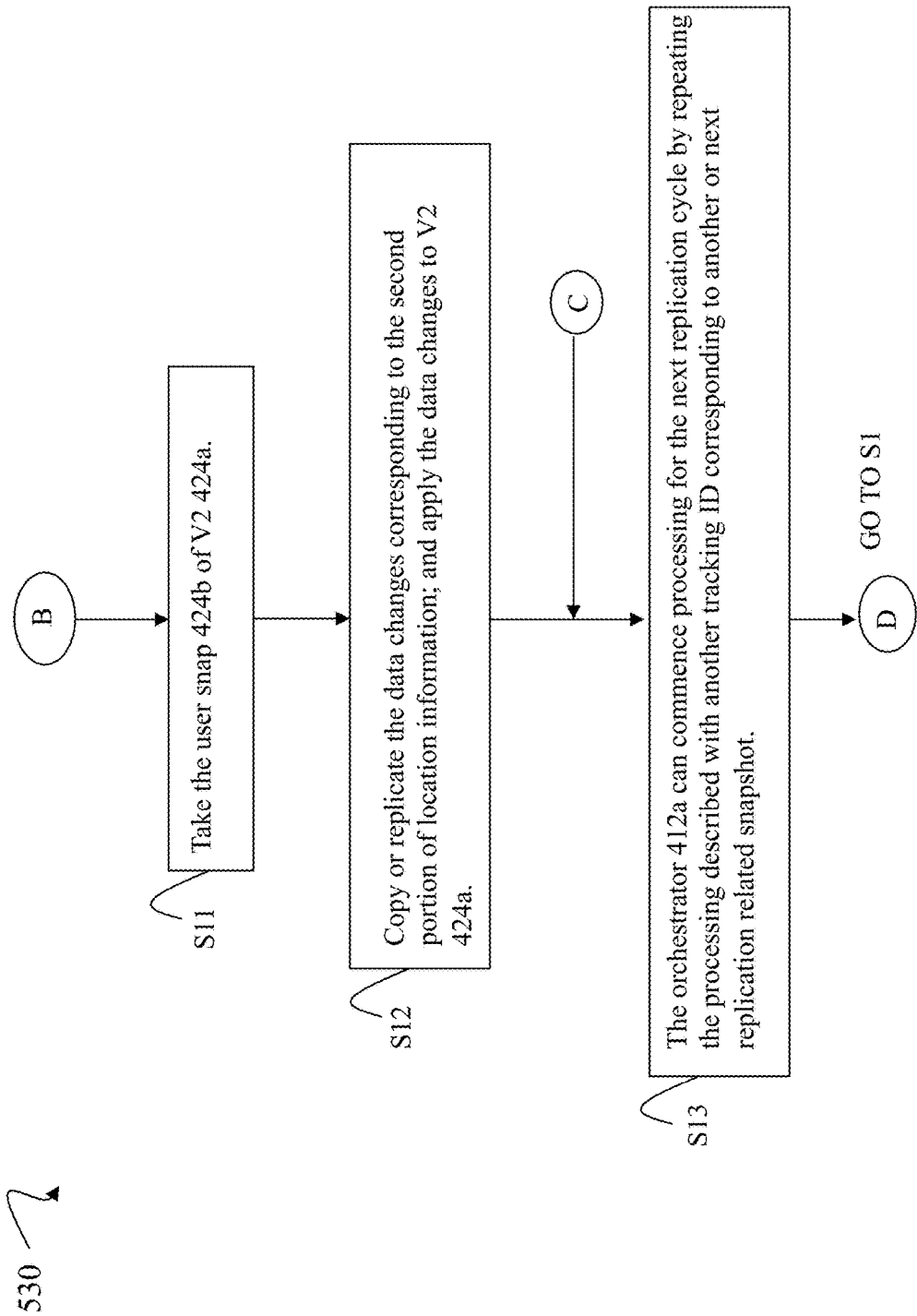

Referring to FIGS. 7A, 7B and 7C, shown is a flowchart 500, 520, 530 of processing steps that can be performed in at least one embodiment in accordance with the techniques of the present disclosure in connection with taking or creating a user snapshot of a stretched volume while asynchronous replication is active or ongoing for the stretched volume. Consistent with discussion herein, taking a user snapshot of the stretched volume, and thus taking a user snapshot 404*c* of source volume V1 404*a*, results in also taking an identical user snapshot 424*b* of the target volume V2 424*a*.

In a first step S1, orchestrator 412*a* can initiate creating or taking the next or new replication related snap of V1 404*a*, such as to create replication related snap 404*b*. Orchestrator 412*a* can issue a command to usher 402 with a new or next tracking ID=Y to be used to uniquely identify the replication related snap 404*b* of V1 404*a*. Usher 402 can begin tagging received writes and other operations directed to the stretched volume, and thus the source volume V1 404*a*, with the new tracking ID=Y. The other operations can include requests to create user snapshots of V1 404*a*. In at least one embodiment, the command can also include a second tracking ID that is a tracking ID currently being used tag writes and other operations, such as requests to create user snapshots of V1 404*a*. Thus, usher 402 can start tagging writes and user snapshot creation requests directed to V1 404*a* with the new tracking ID of Y rather than the second tracking ID.

Usher 402 can further communicate with other data paths components, such as namespace 404 and Txcache 406, of the source system regarding the new tracking ID=Y. In particular in at least one embodiment, once Txcache 406 receives the new tracking ID=Y, Txcache 406 can begin tracking tagged writes and user snapshot creation requests directed to V1 404*a* that have the new tracking ID=Y. In at least one embodiment with near zero replication, the Txcache 406 can always be actively tracking writes and user snapshot creation requests directed to V1 404*a* for a single tracking ID. In at least one embodiment, Txcache 406 can store the tagged writes and tagged user snapshot creation requests directed to V1 404*a* in cache where such tagged writes can remain in cache until replicated to the target system 430*b*. Additionally, any requests to create a user snapshot of V1 404*a* can also remain in the cache until processed as part of the replication stream including the tagged writes with the same tracking ID=Y.

Following the step S1, the step S1A can be performed. In the step S1A, various operations, commands and/or requests directed to the stretched volume, and thus the source volume V1 404*c*, can be received at the source system 430. For example, the operations, commands and/or requests received at the source system 430*a* can include writes 416 directed to the stretched volume, and thus the source volume V1 404*c*. The writes 416 are tagged with the tracking ID=Y and also such writes tagged with tracking ID=Y are tracked by Txcache 406. In connection with tracking a tagged write with tracking ID=Y, Txcache 406 can record metadata or information including the volume, offset and length corresponding to the target location written to by the write.

Additionally, the operations, commands and/or requests received at the source system 430*a* in the step S1A can include a request 417 to create a user snapshot of the stretched volume, and thus the source volume V1 404*a*. In at least one embodiment, the request 417 can be a request to create identical user snapshots of the source volume V1 404*a* and target volume V2 424*a* configured as the stretched volume.

In response to receiving the request to create the user snapshot, the source system 430*a* can create or take the user snap 404*c* of V1 404*a*. Additionally, the request can be tagged with the tracking ID=Y and tracked by Txcache 406. Txcache 406 can track the user snapshot creation request 417 by recording information regarding the request. In at least one embodiment, Txcache 406 can include a record in the stream of tracked writes with the tracking ID=Y where the record can denote the user snapshot creation request relative to the time order of received tagged writes directed to V1 404*a*. In at least one embodiment as discussed in more detail below, the position of the record denoting the user snapshot creation request 417 relative to tracked writes directed to V1 404*a* with tracking ID=Y can be used to determine the particular tracked writes, if any, that are included in the user snapshots 404*c*, 424*b* created as a result of the request 417. Consistent with discussion herein, the request 417 can result in creating identical user snapshots 404*c*, 424*b*, respectively of V1 404*a* and V2 424*a*.

Following the step S1A, a step S2 can be performed. In the step S2, orchestrator 412*a* issues a command or request C1 to ranger 414 for the LBAs, locations or offsets of the next set of differences or data changes to be replicated for the current replication cycle to the target system 430*b*. In particular, the command C1 can specify a tracking ID uniquely identifying a replication related snapshot of V1 404*a* corresponding to the current replication cycle, where the replication related snapshot includes the data changes to be replicated in the current replication cycle. In this example, the command C1 can include the tracking ID=Y. From the step S2, control can proceed to a step S3.

At the step S3, in response to receiving the command C1 with the tracking ID=Y from the orchestrator 412*a*, ranger 414 can query Txcache 406 for metadata or information of all tracked writes and any user snapshot creation commands tagged with the tracking ID=Y. The tracked writes with tracking ID=Y can denote the data changes that need to be replicated in the current replication cycle from the replication related snap 404*b* corresponding to the tracking ID=Y. Following the step S3 is a step S4.

In the step S4, Txcache 406 can return the requested metadata or information to ranger 414. Following the step S4 is a step S5.

In the step S5, ranger 414 can process the metadata or information regarding the tracked writes and any user snapshot creation requests tagged with the tracking ID=Y. In at least one embodiment, ranger 414 can sort and aggregate the offsets or locations and length information of the metadata to determine contiguous regions of offsets or locations of V1 404*a* written to by the tracked writes with tracking ID=Y. The contiguous regions of offsets or locations of V1 404*a* determined by ranger 414 based on the metadata or information of tracked writes with tracking ID=Y denote the locations or offsets of the next set of differences or data changes to be replicated for the current replication cycle to the target system.

Following the step S5, a step S6 can be performed where a determination is made as to whether there are any detected user snapshot create requests denoted by the metadata or information returned from Txcache 406 to ranger 414. If the step S6 evaluates to no, control proceeds to the step S7.

At the step S7, if there are no detected user snapshot creation requests denoted by the metadata or information returned from Txcache 406 to ranger 414, ranger 414 can send a reply or response to the orchestrator 412*a* with location information identifying the logical addresses of the contiguous regions of offsets or locations of V1 404*a*. In particular in this case with no user snapshot creation requests, the contiguous regions can correspond to an aggregation of all the tracked writes with the tracking ID=Y.

Following the step S7, a step S8 can be performed where orchestrator 412*a* instructs copier 408 to copy or replicate the data changes corresponding to the location information (as returned from ranger 414 in the step S7) from the replication related snap 404*b* identified by the tracking ID=Y. Processing can include copier 408 reading the data changes (401*a*) corresponding to the location information from the replication related snap 404*b*, and then copier 408 writing or replicating the data changes (401*b*) to usher 422 of the target system 430*b*. Usher 422 can then write or apply the data changes replicated to the target volume V2 by communicating with other target system data path components, such as namespace 424 and Txcache 426. From the step S8, control proceeds to the step S13.

Alternatively, if the step S6 evaluates to yes control proceeds to the step S9. At the step S9, if there is a detected user snapshot creation request denoted by the metadata or information returned from Txcache 406 to ranger 414, in at least one embodiment ranger 414 can send multiple replies or responses to the orchestrator 412*a*. In a first reply to the orchestrator 412*a*, ranger 414 can send a first portion of location information identifying logical addresses or locations of V1 404*a* of data changes that need to be included in the user snapshot 424*b* of V2 424*a* along with an indication to create or taken the user snapshot 424*b* after data changes corresponding to the first portion of location information are applied to V2 424*a*. Additionally, in a second reply to orchestrator 412*a*, ranger 414 can send a second portion of location information identifying remaining logical addresses or locations of V1 404*a* of data changes that need to be applied to V2 424*a* after the user snapshot 424*b* of V2 424*a* is taken. Following the step S9 is a step S10.

In the step S10, in response to receiving the first reply noted above, orchestrator 412*a* instructs copier 408 to copy or replicate the data changes corresponding to the first portion of location information from the replication related snap 404*b* identified by the tracking ID=Y. Processing can include copier 408 reading the data changes (401*a*) corresponding to the first portion of location information from the replication related snap 404*b*, and then copier 408 writing or replicating the data changes (401*b*) to usher 422 of the target system 430*b*. Usher 422 can then write or apply the data changes replicated to the target volume V2 424*a* by communicating with other target system data path components, such as namespace 424 and Txcache 426. Following the step S10, a step S11 is performed.

In the step S11, after the data changes corresponding to the first portion of location information are applied to V2 424*a*, the orchestrator 412*a* of the source system can communicate with the orchestrator 412*b* of the target system 430*b* to take or create the user snap 424*b* of V2 424*a*. The orchestrator 412*b* can communicate with other components of the target system's data path to create user snap 424*b* of V2 424*a*. For example, the orchestrator 412*b* can communicate with the components 422, 424 and 426 of the target system's data path to create the user snap 424*b*. Following the step S11 is a step S12.

In the step S12, after the user snap 424*b* is taken, orchestrator 412*a* instructs copier 408 to copy or replicate the data changes corresponding to the second portion of location information from the replication related snap 404*b* identified by the tracking ID=Y. Processing can include copier 408 reading the data changes (401*a*) corresponding to the second portion of location information from the replication related snap 404*b*, and then copier 408 writing or replicating the data changes (401*b*) to usher 422 of the target system 430*b*. Usher 422 can then write or apply the data changes replicated to the target volume V2 424*a* by communicating with other target system data path components, such as namespace 424 and Txcache 426.

Generally, the above summarizes processing performed where the stream of metadata or information for the tracking ID=Y includes only a single request for user snapshot creation of V1 404*a*. More generally, a single stream of metadata or information for a tracking ID can include more than one such request depending on the number of requests received from one or more users or customers. Generally, the request to create a user snapshot can denote a boundary within the time ordered stream of tracked writes with the tracking ID where tracked writes prior to the boundary (e.g., user snapshot creation request) are included in the user created snapshots 404*c* and 424*b*, and where tracked write after the boundary are not included in the user created snapshots 404*c* and 424*b*.

From the step S12, control proceeds to the step S13. At the step S13, once the data changes for the current replication cycle corresponding to the tracked writes with the tracking ID=Y have been replicated, the orchestrator 412*a* can commence processing for the next replication cycle by repeating the processing described with another tracking ID corresponding to another or next replication related snapshot. Thus from the step S13, control can return to the step S1.

Figure 8:
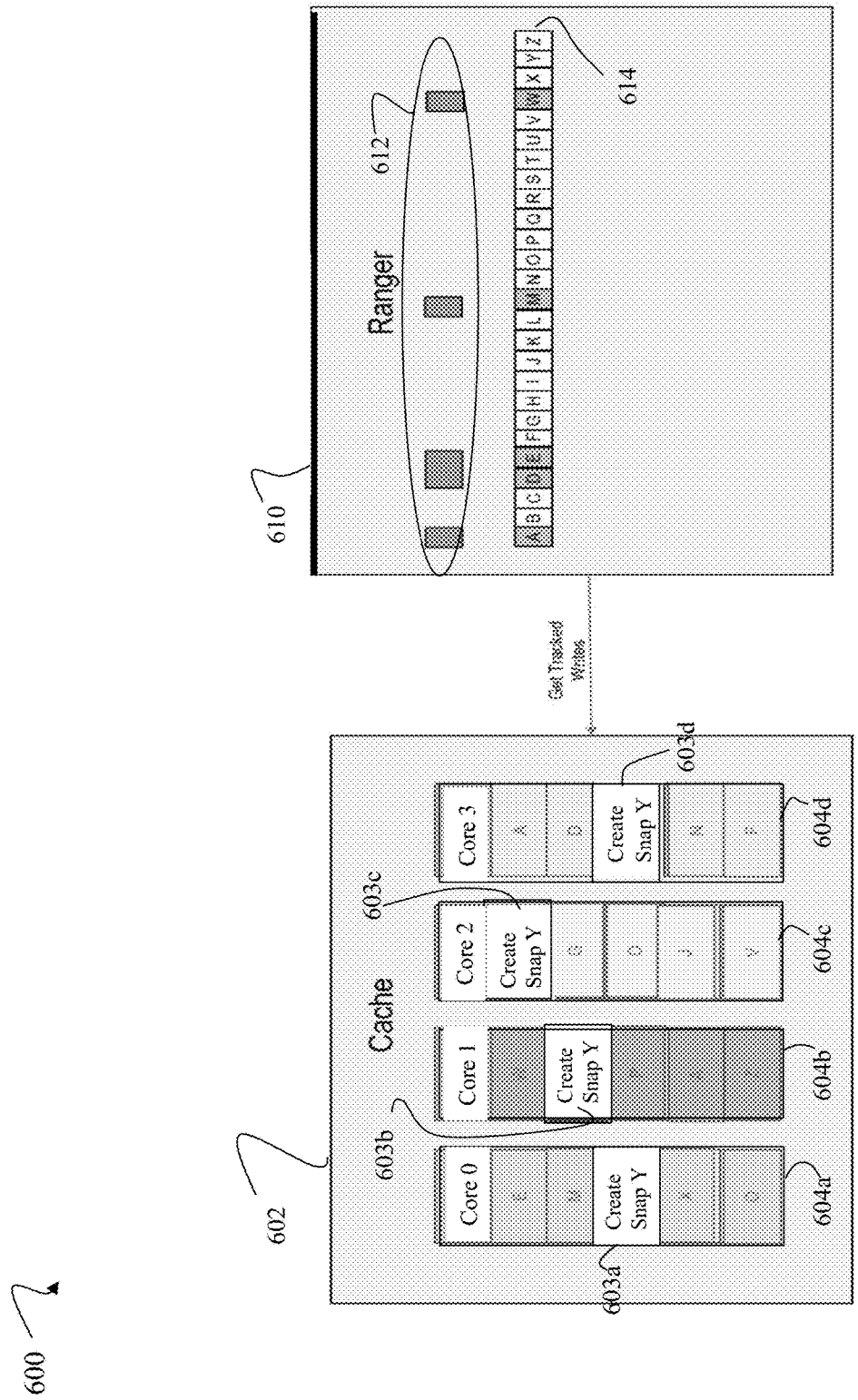
FIGS. 8 and 9 are examples illustrating processing performed by source system components in at least one embodiment in accordance with the techniques of the present disclosure.
Figure 9:
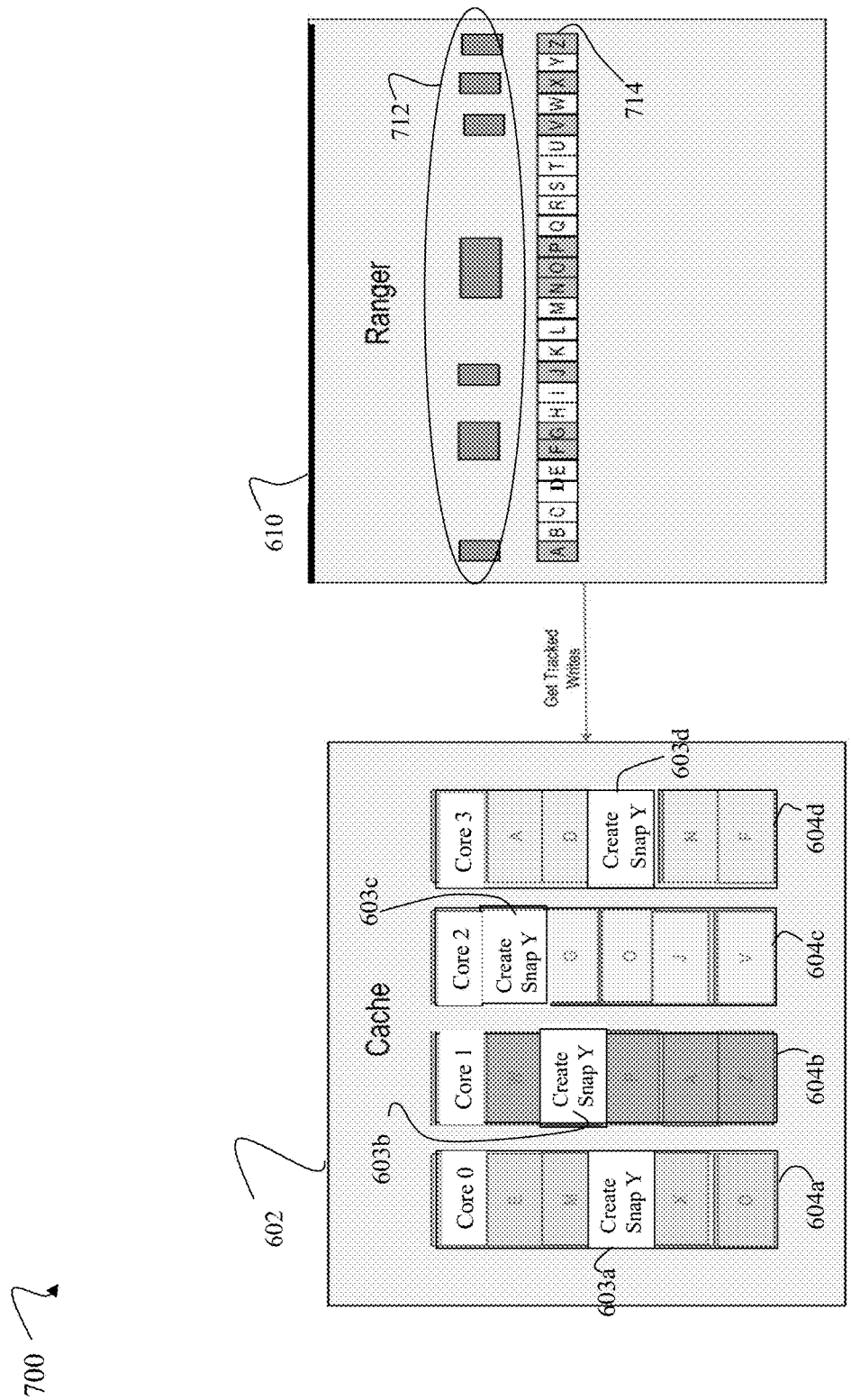

What will now be described in connection with FIGS. 8 and 9 are further details in connection with tracking writes and requests to create user snapshots of the stretched volume, and thus the source volume V1 404*a* in at least one embodiment in accordance with the techniques of the present disclosure.

Referring to FIG. 8, shown is an example 600 of the cache 602 and the ranger component 610 of the source system 430a with a multi-core processor in at least one embodiment.

The example 600 illustrates the cache 602 as can be maintained by the Txcache component or layer 406 of the source system. In at least one embodiment with N processing cores, where N=4, the cache 602 can include tracking buffers 604a-d. Each of the tracking buffers 604a-d can be used by a single corresponding one of the 4 cores in connection with tracking writes and user snapshot requests tagged with a currently active tracking ID. As discussed above (e.g., the step S3 of FIG. 7A), ranger 610 (corresponding to 414 of FIG. 6) can query or issue a request to Txcache 406 to obtain information or metadata recorded in the cache 602 for writes and user snapshot creation requests tagged with a specified tracking ID, such as Y.

In the example 600, A-Z 614 can denote the LBA, offset or locations in the logical address range of the source volume V1 404a. A write directed to V1 404a that writes to one of the LBAs denoted A-Z can be tagged with the current tracking ID of Y.

In at least one embodiment with a multi-core processor, commands requests and operations, such as writes and requests to create user snapshots, that are received at the source system 430a and directed to the source volume V1 404a (and thus directed to the stretched volume configured from local volumes 404a, 424b) can be assigned for processing to multiple cores on the source system. Each of the 4 cores in the example 600 can have an associated tracking buffer 604a-d included in the cache 602 of the source system 430a. In at least one embodiment, the per core tracking buffer including the core's assigned writes can store the writes in relative time order as to when the write is received at the source system and assigned to the particular core for processing. A tagged write with the tracking ID=Y can write to a target logical address that is one of the letters A-Z 614 corresponding to a particular one of the A-Z LBAs or offsets forming V1 404a's logical address range. Thus tagged writes with tracking ID Y included in the tracking buffers 604a-d can be denoted by the particular upper case letter (e.g., one of A through Z) corresponding to the write's target logical address or location. For example, the tracking buffer 604a for core 0 includes entries "E", "M", "X" and "O" indicating four tagged writes with the tracking ID=Y, where the 4 tagged writes are assigned to core 0 and write, respectively, to LBAs E, M, X and O of V1 404a.

A user can issue a user snapshot request 417 to create a snapshot of the source volume exposed as the stretched volume. The source system can receive the user snapshot (snap) request 417 that is then tagged with the current tracking ID=Y, of the source volume V1 404a. Additionally, writes directed to the source volume V1 404a can also be tagged with the current tracking ID of Y, where Y can be uniquely associated with the particular replication related snapshot 404b of the source volume V1 that will include content written by the writes tagged with tracking ID Y.

In response to the source system receiving the user snapshot creation request 417, data path components such as usher 402 and namespace 404 of the source system 430a can create the user snapshot 404c of V1 404a. Additionally, the source system can record the snap request 417 in all the tracking buffers 604-d across all the cores. In particular, the elements 603a-d denote the records for the snap request 417 as recorded in the tracking buffers 604a-d.

In at least one embodiment, the records 603a-d for the snap request 417 can be atomically recorded in the tracking buffers 604a-d of all the cores. The writes and records 603a-d for the snap request in each core's tracking buffer 604a-d can be stored in relative time order as to when the writes and snap request are received relative to one another. Thus the position of the record denoting the snap request in a core's tracking buffer denotes the point in time when the snap request is received and the corresponding snapshot of the source volume created with respect to writes assigned to the core. As discussed below, the tracked writes of the core tracking buffers 604a-d occurring prior to a record 603a-d denoting the snap request have been applied to the source volume V1 404a and included in the user snapshot 404b of the source volume created in response to the snap request.

In at least one embodiment, each per core tracking buffer 604a-d can record writes and any user snap creation requests in increasing time order. All writes of a per core tracking buffer that occur before the snap request can be included in the user created snapshot of the snap request. All writes of a per core tracking buffer that occur after the snap request are not included in the user created snapshot of the snap request. Thus the record of the snap request can serve as a boundary record recorded in each tracking buffer to identify the writes that are received prior to the snap request, where the writes received prior to the snap request are included in the user created snapshot of the source volume.

To further illustrate, the tracking buffer 604a for core 0 includes two writes to offsets E and M that are received and assigned to core 0 prior to the create user snapshot request record 603a; the tracking buffer 604b for core 1 includes a single write to offset W received and assigned to core 1 prior to the create user snapshot request record 603b; the tracking buffer 604c for core 2 includes a no writes received and assigned to core 2 prior to the create user snapshot request record 603c; and the tracking buffer 604d for core 3 includes two writes to offsets A and D received and assigned to core 3 prior to the create user snapshot request record 603d. Thus, the foregoing writes recorded in the tracking buffers 604a-d and occurring prior to the records 603a-d can be included in the user snapshot 404c of V1 404a.

The tracking buffer 604a for core 0 includes two writes to offsets X and O that are received and assigned to core 0 after the create user snapshot request record 603a; the tracking buffer 604b for core 1 includes a 3 writes requests to offset P, A and Z received and assigned to core 1 after the create user snapshot request record 603b; the tracking buffer 604c for core 2 includes 4 writes to offsets G, O J and V received and assigned to core 2 after the create user snapshot request record 603c; and the tracking buffer 604d for core 3 includes two writes to offsets N and F received and assigned to core 3 after the create user snapshot request record 603d. Thus, the foregoing writes recorded in the tracking buffers 604a-d and occurring after the records 603a-d are not included in the user snapshot 404c of V1 404a.

As noted above in the step S2, orchestrator 412a can send ranger 610, 414 a first instruction or command. The first instruction or command can instruct ranger to identify the next set of differences corresponding to the next replication related snapshot to be copied or replicated from the source system to the target system. Orchestrator 412a provides ranger 610, 414 with a particular tracking ID (e.g., Y) to identify the next set of differences for the next replication related snapshot of the source volume. Orchestrator 412a can generate tracking IDs and thus knows which tracking IDs correspond to which particular snapshots of the source volume.

As noted above in the step S3 and illustrated in connection with the FIGS. 8 and 9, ranger 610 queries the Txcache 406 to obtain information or metadata as recorded in the cache 602 regarding all tracked writes having the particular tracking ID of Y.

In response, Txcache 406 returns (S4) the metadata or information regarding all tracked writes and snap request(s) with the requested particular tracking ID=Y. In at least one embodiment, Txcache 406 can return metadata or information identifying the LBAs, offsets or locations in the source volume corresponding to the tracked writes for the requested tracking ID. The metadata or information returned can also preserve or identify the relative time order of the tracked writes and snap requests in the per core tracking buffers 604a-d.

In at least one embodiment, ranger 610, 414 can process the returned metadata of tracked writes of each per core tracking buffer 604a-d in increasing relative time order until the records 603a-d denoting the user snap creation request 417 is reached.

Once the snap request record 603a-d in each per core tracking buffer 604a-d is reached, processing of the stream of tracked write metadata can be paused. At this point as discussed in the step S9 of FIG. 7B, ranger 610 can produce a first portion of differences or locations corresponding to data changes where the first portion of differences denotes data changes included in the user created snapshot 404c. The first portion of differences can include all tracked writes which have the same tracking ID as the snap request record and which appear in the time ordered tracking buffers 604a-d prior to the snap request records 603a-d. Thus the first portion of differences include tracked writes received and assigned to the cores prior to receiving the snap request.

Referring to FIG. 8, illustrated is the first portion of locations corresponding to the data changes included in the user created snapshot 404c based on tracked writes with tracking ID=Y occurring prior to the records 603a-d in the tracking buffer 604a-d. Subsequently, ranger can sort the locations or LBAs of the tracked writes of the first portion of differences to identify contiguous regions or ranges of offsets 612. In at least one embodiment, ranger 610 can generate a list, such as a scatter gather list (SGL), that defines the particular contiguous regions or ranges 612 of offsets corresponding to tracked writes to be included in the user created snapshot. In the example 600, the first portion of differences corresponds to the LBAs or offsets A, D, E, M and W as denoted by the shaded letters of 614.

In response to the first instruction from orchestrator 412a, ranger 610, 414 can return (S9) a first reply or response to orchestrator. The first reply or response to the orchestrator can identify the first portion of differences (612, 614), such as in the form of an SGL or any other suitable form, along with an indication that orchestrator needs to create a user snapshot of the target volume on the target system after applying the first portion of differences to the target volume. In the first reply or response returned to the orchestrator 412a, ranger 610, 414 can also return an indication that the requested differences corresponding to the particular tracking ID Y will be returned in multiple responses or replies where the first portion of differences is included in the first of the multiple responses or replies.

In response to receiving the first reply from ranger, orchestrator can instruct copier to read a first portion of data changes from a particular source volume snapshot corresponding to the first portion of differences. The particular source volume snapshot can uniquely correspond to and be identified by orchestrator using the tracking ID sent in the first instruction to ranger.

The first portion of data changes can be replicated (S10) to the target system and applied to the target volume. Once the first portion of data changes are applied to the target volume, orchestrator can instruct the target system to take or create (S11 of FIG. 7C) the user snapshot 424b of the target volume V2 424b.

In at least one embodiment, the orchestrator of the source system can issue a request to the target system's orchestrator to create or take the user snapshot of the target volume. In response, the target system's orchestrator can communicate with other target system components, such as usher and namespace, to create the user snapshot of the target volume. At this point, the user snapshot of the target volume just taken on the target system is identical to the user snapshot of the corresponding source volume on the source system.

is an example 700 illustrating processing performed by ranger 610 in connection with processing the remaining tracked writes of the tracking buffers 604d that occur after the records 603a-d.

Ranger can process the remaining tracked writes of the per core tracking buffers in a manner similar to that as noted above to generate a list of contiguous regions 712 of offsets and lengths. The second portion of differences can include all tracked writes with the same tracking ID as the snap request record and which appear in the time ordered tracking buffers 604a-d AFTER the create user snap request records 603a-d. In at least one embodiment, ranger 610 can generate an SGL corresponding to the second portion of differences 712 and return the SGL to the orchestrator as part of the second response or reply.

Referring to the example 700 of FIG. 9, element 712 can denote the contiguous regions of offsets and lengths determined for the tracked writes occurring after the records 603a-d in the tracking buffers 604a-d. The element 714 can denote the logical address range of LBAs, offsets or locations of V1 404c in a manner as described for element 614 of FIG. 8. In the example 700, the second portion of differences or data changes correspond to the LBAs or offsets A, F G, J, N, O P, V, X and Z as denoted by the shaded letters of 714.

Responsive to receiving the second reply from ranger 610, 414 corresponding to the first instruction, orchestrator 412a can instruct copier 408 to start copying the second portion of differences 712, 714 by reading a second portion of data changes from the particular source volume replication related snapshot 404b corresponding to the second portion of differences. The second portion of data changes can be replicated to the target system and applied to the target volume V2 424a.

At this point, the current near zero replication cycle of data changes corresponding to the tracking ID is complete and the source system can perform processing to commence with the next near zero replication cycle of data changes corresponding to another tracking ID that uniquely identifies a corresponding replication related snapshot of the source volume.

In at least one embodiment, the source system can maintain the tracked writes and snapshot creation records per source volume or more generally per source storage object or resource. In at least one embodiment, the techniques of the present disclosure for a single stretched volume can be extended to groups of volumes, objects or resources by applying group logic. Thus in at least one embodiment, the request to create a user snapshot can specify a group of stretched volumes or resources rather than a single stretched volume or resource. For illustration, consider a group of 2 stretched volumes A and B. The stretched volume A can be configured from the source volume A on the source system and the target volume A on the target system. The stretched volume B can be configured from the source volume B on the source system and the target volume B on the target system.

In at least one embodiment, customer snapshot creation for a group can be performed in a crash consistent way. In at least one embodiment, crash consistency can be accomplished by first holding write I/O completions across all source volumes in the volume group prior to creating a user snapshot of any source or target volume. Once write I/Os are held, then the orchestrator can enumerate the source volumes in the group and create user snapshots. As stated above processing on the source system in at least one embodiment can track writes and snapshot creation requests per volume, but by holding the write I/O completions for the entire group, the user snapshots of the source volumes and target volumes in the group are all crash consistent.

In at least one embodiment, usher 402 on the source system can coordinate the above-noted withholding or pausing write I/O completion with respect to write I/Os directed to stretched volumes, and thus source volumes, of the group. In the particular example noted above for a group including the stretched volumes A and B, write I/O acknowledgements can be temporarily paused or withheld for write I/Os directed to the stretched volumes A and B, and thus the source volumes A and B, on the source system.

In at least one embodiment, rather than pause or withhold write I/O completion as noted above for the group, processing can alternatively quiesce write I/Os directed to the group. For example, quiescing can include temporarily pausing or queuing in a wait queue any new writes directed to the source volumes A and B received at the source system. Thus no new writes directed to the volume group can commenced or started.

The foregoing quiescing of write I/Os directed to volumes of the volume group or alternatively pausing write I/O acknowledgements can be performed to maintain write order consistency and provide for crash consistency among created user snapshots of the source and target volumes.

Once writes are quiesced or otherwise acknowledgements of writes directed to source volumes A and B are withheld, processing on the source system, such as by the orchestrator, can issue requests to create user snapshots for both source volume A and source volume B on the source system. Consistent with other discussion herein, such processing can also create user snapshots for both the target volumes A and B on the target system in response to detecting or encountering user snapshot request records in streams of tracked writes of a replication related snapshot for a replication cycle.

In at least one embodiment, before creating the user snapshots of the target volumes A and B on the target system, the orchestrator can wait until it detects a create snapshot record in all the write tracking streams of all source volumes of the group. For example, the orchestrator can wait until processing a first stream of tracked writes of source volume A detects a create snapshot record and until processing a second stream or tracked writes of the source volume B detects a create snapshot record before creating the user snapshots of the target volume A and the target volume B on the target system.

In at least one embodiment, once processing by orchestrator detects the create snapshot records of the streams of tracked writes for both the source volume A and the source volume B of the source system, the streams of tracked writes of replication for both the source volume A and source volume B can be paused to create the user snapshots of the target volumes A and B on the target system. Subsequently, the streams of tracked writes of replication of the source volumes A and B can be resumed. In at least one embodiment, the source system can wait until an acknowledgement is received from the target system regarding receipt of data changes for the current replication cycle or current replication related snapshots of both the source volumes A and B before proceeding with the next replication cycle. Put another way in at least one embodiment, the next near zero replication cycle may not commence for any volume in the volume group until the source system receives an acknowledgement from the target system regarding receipt of data changes of the current replication related snapshots for both the source volume A and the source volume B. Alternatively in at least one embodiment, each near zero replication stream and processing associated with a single source volume of a group can proceed independently of any other source volume in the same group.

Once the user snapshots of the source volume A and source volume B are created on the source system, a snapshot group can be defined and exposed to the user where the snapshot group of the source system includes the newly created user snapshots of the source volume A and the source volume B.

Once the user snapshots of the target volume A and target volume B are created on the target system, a snapshot group can be defined and exposed to the user where the snapshot group of the target system includes the newly created user snapshots of the target volume A and the target volume B.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:
1. A computer-implemented method comprising:
performing asynchronous replication of a stretched storage object configured from a source storage object of a source system and a target storage object of a target system;
tracking writes that are directed to the source storage object and tagged with a first tracking identifier (ID) associated with a first replication related snapshot of the source storage object, wherein said tracking includes recording metadata of tracked writes including target locations written to by tagged writes;
receiving a request at the source system to create identical user snapshots of the source storage object and the target storage object;
in response to receiving the request at the source system, performing first processing including:

creating a first user snapshot of the source storage object on the source system; and storing a record in the metadata of tracked writes denoting a time order of the request relative to tracked writes tagged with the first tracking ID;

determining, in accordance with said tracking, a first set of tracked writes that are directed to the source storage object, tagged with the first tracking ID, and received before the request to create identical snapshots;

determining, using the metadata of tracked writes, a first set of locations of the source storage object corresponding to the first set of tracked writes;

determining first data changes, that correspond to the first set of locations, from the first replication related snapshot of the source object;

replicating the first data changes from the source system to the target system;

applying the first data changes to the target storage object; and creating a second user snapshot of the target storage object after the first data changes are applied to the target storage object.

2. The computer-implemented method of claim 1, wherein the source storage object and the target storage object are configured to have a same identity as a same storage object when exposed to a host over paths from the source system and target system, wherein writes to the source storage object received at the source system are automatically asynchronously replicated from the source system to the target system and applied to the target storage object.

3. The computer-implemented method of claim 1, wherein said tracking is included in second processing performed to create the first replication related snapshot of the source storage object, and wherein the second processing further comprises:

tagging writes directed to the source storage object with the first tracking ID associated with the first replication related snapshot of the source storage object.

4. The computer-implemented method of claim 1, further comprising:

before receiving the request at the source system to create identical user snapshots of the source storage object and the target storage object, sending first writes directed to the stretched volume from the host to the source system, wherein the first writes are applied to the source storage object and automatically asynchronously replicated to the target system, the first writes are tagged with the first tracking ID, the first writes are tracked by said tracking, and the first writes are included in the first set of tracked writes.

5. The computer-implemented method of claim 4, wherein the metadata of tracked writes indicates that the first writes are received at the source system at one or more times prior to receiving the request to create identical user snapshots.

6. The computer-implemented method of claim 5, further comprising:

after receiving the request at the source system to create identical user snapshots of the source storage object and the target storage object, sending second writes directed to the stretched volume from the host to the source system, wherein the second writes are applied to the source storage object and automatically asynchronously replicated to the target system, the second writes are tagged with the first tracking ID, the second writes are tracked by said tracking, and the second writes are not included in the first set of tracked writes.

7. The computer-implemented method of claim 6, wherein the metadata of tracked writes indicates that the second writes are received at the source system at one or more times after receiving the request to create identical snapshots.

8. The computer-implemented method of claim 7, wherein the first user snapshot of the source storage object on the source system includes the first writes but does not include the second writes, wherein the second user snapshot of the target storage object on the target system includes the first writes but does not include the second writes, and wherein the first user snapshot and the second user snapshot are identical in terms of content.

9. The computer-implemented method of claim 6, further comprising:

determining, in accordance with said tracking, a second set of tracked writes that are directed to the source storage object, tagged with the first tracking ID, and received after the request to create identical snapshots, wherein the second writes are included in the second set of track writes;

determining, using the metadata of tracked writes, a second set of locations of the source storage object corresponding to the second set of tracked writes;

determining second data changes, that correspond to the second set of locations, from the first replication related snapshot of the source object;

replicating the second data changes from the source system to the target system; and applying the second data changes to the target storage object after the second user snapshot of the target storage object is created.

10. The computer-implemented method of claim 1, wherein the source storage object is exposed to the host over one or more first paths between the host and the source system and wherein the one or more first paths are designated as active where the host issues I/O requests to the source storage object configured as a first storage object exposed over the one or more first paths.

11. The computer-implemented method of claim 10, wherein the target storage object is exposed to the host over one or more second paths between the host and the target system and wherein the one or more second paths are designated as passive where the host is unable to issue I/O requests to the target storage object configured as the first storage object exposed over the one or more second paths.

12. The computer-implemented method of claim 1, wherein the source storage object and the target storage object are a first resource or object type.

13. The computer-implemented method of claim 12, wherein the first resource or object type is one of a set of predefined types, wherein the first resource or object type is any of: a volume, a logical device, a file, a directory, and a file system.

14. The computer-implemented method of claim 1, wherein said tracking is performed by a caching layer, and wherein tracked writes corresponding to the first replication related snapshot of the source storage object remain in a cache until replicated from the source system to the target system.

15. A non-transitory computer-readable media comprising code stored thereon that, when executed, performs a method comprising:

performing asynchronous replication of a stretched storage object configured from a source storage object of a source system and a target storage object of a target system;

tracking writes that are directed to the source storage object and tagged with a first tracking identifier (ID) associated with a first replication related snapshot of the source storage object, wherein said tracking includes recording metadata of tracked writes including target locations written to by tagged writes;

receiving a request at the source system to create identical user snapshots of the source storage object and the target storage object;

in response to receiving the request at the source system, performing first processing including:
creating a first user snapshot of the source storage object on the source system; and
storing a record in the metadata of tracked writes denoting a time order of the request relative to tracked writes tagged with the first tracking ID;

determining, in accordance with said tracking, a first set of tracked writes that are directed to the source storage object, tagged with the first tracking ID, and received before the request to create identical snapshots;

determining, using the metadata of tracked writes, a first set of locations of the source storage object corresponding to the first set of tracked writes;

determining first data changes, that correspond to the first set of locations, from the first replication related snapshot of the source object;

replicating the first data changes from the source system to the target system;

applying the first data changes to the target storage object; and creating a second user snapshot of the target storage object after the first data changes are applied to the target storage object.

16. The non-transitory computer-readable media of claim 15, wherein the source storage object and the target storage object are configured to have a same identity as a same storage object when exposed to a host over paths from the source system and target system, wherein writes to the source storage object received at the source system are automatically asynchronously replicated from the source system to the target system and applied to the target storage object.

17. The non-transitory computer-readable media of claim 15, wherein said tracking is included in second processing performed to create the first replication related snapshot of the source storage object, and wherein the second processing further comprises:
tagging writes directed to the source storage object with the first tracking ID associated with the first replication related snapshot of the source storage object.

18. The non-transitory computer-readable media of claim 15, further comprising:
before receiving the request at the source system to create identical user snapshots of the source storage object and the target storage object, sending first writes directed to the stretched volume from the host to the source system, wherein the first writes are applied to the source storage object and automatically asynchronously replicated to the target system, the first writes are tagged with the first tracking ID, the first writes are tracked by said tracking, and the first writes are included in the first set of tracked writes.

19. The non-transitory computer-readable media of claim 18, wherein the metadata of tracked writes indicates that the first writes are received at the source system at one or more times prior to receiving the request to create identical user snapshots.

20. A system comprising:
one or more processors; and
a memory comprising code stored thereon that, when executed, performs a method comprising:
performing asynchronous replication of a stretched storage object configured from a source storage object of a source system and a target storage object of a target system;

tracking writes that are directed to the source storage object and tagged with a first tracking identifier (ID) associated with a first replication related snapshot of the source storage object, wherein said tracking includes recording metadata of tracked writes including target locations written to by tagged writes;

receiving a request at the source system to create identical user snapshots of the source storage object and the target storage object;

in response to receiving the request at the source system, performing first processing including:
creating a first user snapshot of the source storage object on the source system; and
storing a record in the metadata of tracked writes denoting a time order of the request relative to tracked writes tagged with the first tracking ID;

determining, in accordance with said tracking, a first set of tracked writes that are directed to the source storage object, tagged with the first tracking ID, and received before the request to create identical snapshots;

determining, using the metadata of tracked writes, a first set of locations of the source storage object corresponding to the first set of tracked writes;

determining first data changes, that correspond to the first set of locations, from the first replication related snapshot of the source object;

replicating the first data changes from the source system to the target system;

applying the first data changes to the target storage object; and creating a second user snapshot of the target storage object after the first data changes are applied to the target storage object.

* * * * *